United States Patent
Takamori et al.

(10) Patent No.: US 10,488,748 B2
(45) Date of Patent: Nov. 26, 2019

(54) IMAGE READING APPARATUS

(71) Applicant: PFU Limited, Ishikawa (JP)

(72) Inventors: Masaya Takamori, Ishikawa (JP); Yuki Kasahara, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 15/964,633

(22) Filed: Apr. 27, 2018

(65) Prior Publication Data
US 2018/0246401 A1 Aug. 30, 2018

Related U.S. Application Data

(63) Continuation of application No. PCT/JP2015/086408, filed on Dec. 25, 2015.

(51) Int. Cl.
*G03B 27/62* (2006.01)
*H04N 1/107* (2006.01)
*H04N 1/00* (2006.01)

(52) U.S. Cl.
CPC ......... *G03B 27/62* (2013.01); *H04N 1/00554* (2013.01); *H04N 1/107* (2013.01); *H04N 2201/0422* (2013.01)

(58) Field of Classification Search
None
See application file for complete search history.

(56) References Cited

U.S. PATENT DOCUMENTS

| | | | | | |
|---|---|---|---|---|---|
| 4,043,064 | A * | 8/1977 | Friedman | ............. | B41J 29/15 40/343 |
| 4,727,400 | A * | 2/1988 | Ito | ............. | G03B 27/6228 355/75 |
| 5,486,932 | A * | 1/1996 | Leonard | ............. | G03B 27/64 355/73 |
| 5,499,793 | A * | 3/1996 | Salansky | ............. | A47B 81/06 160/24 |
| 5,663,812 | A * | 9/1997 | Pan | ............. | H04N 1/0057 358/474 |
| 5,936,740 | A * | 8/1999 | Fukazawa | ............. | B41J 2/1752 347/263 |
| 6,185,010 | B1 * | 2/2001 | Watanabe | ............. | H04N 1/00278 358/442 |
| 7,048,245 | B1 * | 5/2006 | Voelker | ............. | G06F 1/1601 248/309.1 |
| 7,196,828 | B2 * | 3/2007 | Rubner | ............. | H04N 1/00525 358/474 |

(Continued)

FOREIGN PATENT DOCUMENTS

| | | |
|---|---|---|
| JP | S63-031268 A | 2/1988 |
| JP | H03-150551 A | 6/1991 |

(Continued)

OTHER PUBLICATIONS

International Search Report issued in Application No. PCT/JP2015/086408 dated Feb. 16, 2016.

*Primary Examiner* — Anh-Vinh T Nguyen

(74) *Attorney, Agent, or Firm* — McDermott Will & Emery LLP

(57) ABSTRACT

An image reading apparatus includes a platen, a copyholder pressed against a reading surface of a document placed on the platen, and a placing part movably provided, on which a non-pressed portion of the document that is not pressed by the copyholder is placed.

11 Claims, 16 Drawing Sheets

(56) References Cited

U.S. PATENT DOCUMENTS

| | | | |
|---|---|---|---|
| 7,379,218 B1* | 5/2008 | Terashima | H04N 1/00538 358/296 |
| 9,571,684 B1* | 2/2017 | Phelps | H04N 1/00713 |
| 9,781,283 B1* | 10/2017 | Wilsher | H04N 1/00628 |
| 2002/0097451 A1* | 7/2002 | Lassen | H04N 1/00246 358/497 |
| 2003/0206318 A1* | 11/2003 | Breslawski | H04N 1/00347 358/498 |
| 2004/0041067 A1* | 3/2004 | Jung | A47B 19/06 248/444.1 |
| 2006/0083564 A1* | 4/2006 | Yazawa | B41J 29/023 399/363 |
| 2007/0211313 A1* | 9/2007 | Kurokawa | H04N 1/00538 358/498 |
| 2007/0223055 A1* | 9/2007 | Moribe | H04N 1/00525 358/448 |
| 2008/0180762 A1* | 7/2008 | Andoh | H04N 1/00519 358/498 |
| 2008/0291501 A1* | 11/2008 | Shiraki | H04N 1/00522 358/401 |
| 2010/0046047 A1* | 2/2010 | Makino | H04N 1/00681 358/475 |
| 2011/0249301 A1 | 10/2011 | Takabatake | |
| 2014/0340722 A1* | 11/2014 | Mui | H04N 1/1065 358/497 |
| 2015/0249762 A1* | 9/2015 | Ishida | H04N 1/00713 358/497 |
| 2015/0381835 A1* | 12/2015 | Takabayashi | H04N 1/00522 358/497 |
| 2016/0205280 A1* | 7/2016 | Kato | H04N 1/00551 |
| 2017/0054863 A1* | 2/2017 | Moore | H04N 1/00761 |
| 2017/0171421 A1* | 6/2017 | Yue | H04N 1/10 |
| 2018/0020113 A1* | 1/2018 | Golding | G03G 21/1619 |
| 2019/0098170 A1* | 3/2019 | Kodimer | H04N 1/38 |
| 2019/0129566 A1* | 5/2019 | Toriyama | G06F 3/0416 |
| 2019/0174022 A1* | 6/2019 | Ogino | H04N 1/207 |

FOREIGN PATENT DOCUMENTS

| | | |
|---|---|---|
| JP | H04-358140 A | 12/1992 |
| JP | H09-244161 A | 9/1997 |
| JP | 2000-321683 A | 11/2000 |
| JP | 2011-223466 A | 11/2011 |

* cited by examiner

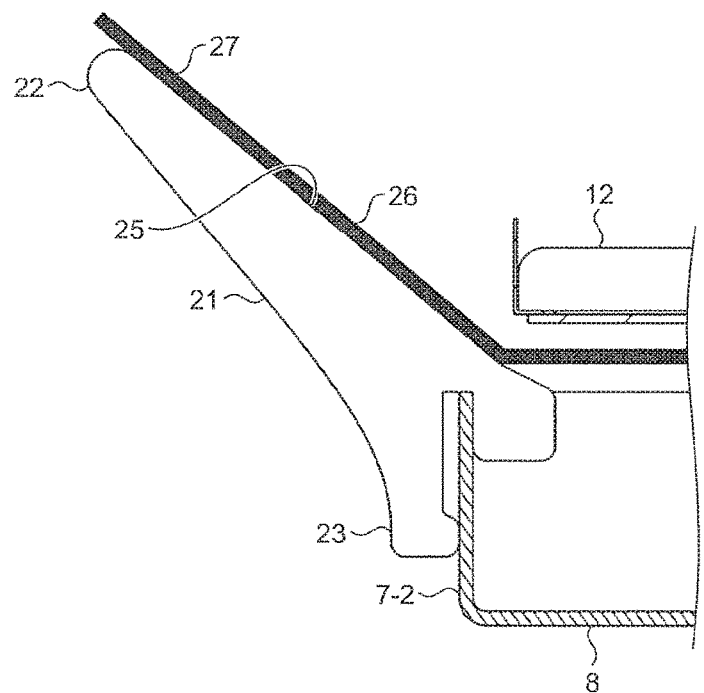
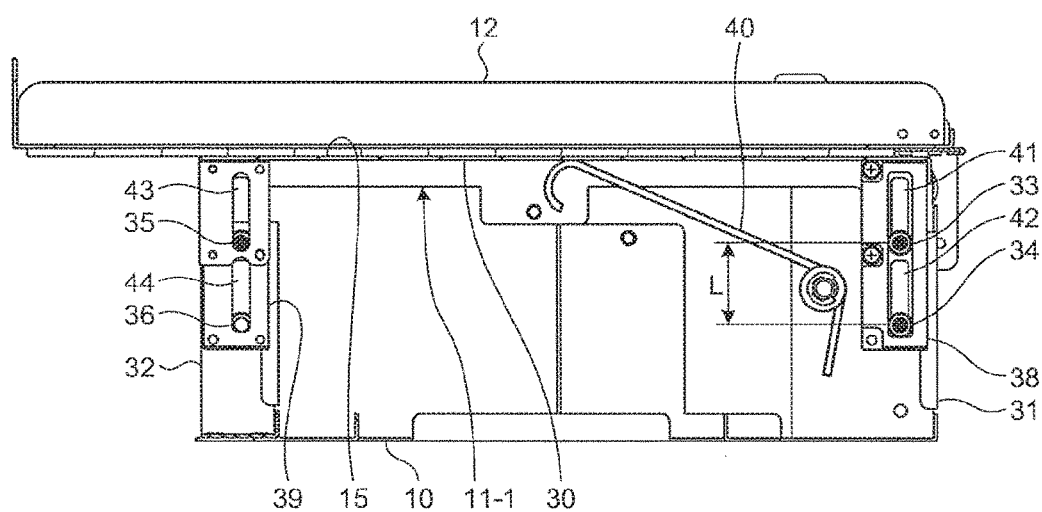

IMAGE READING APPARATUS

CROSS-REFERENCE TO RELATED APPLICATION

This application is a continuation of International Application No. PCT/JP2015/086408, filed on Dec. 25, 2015, the entire contents of which are incorporated herein by reference.

FIELD

The embodiments discussed herein are related to an image reading apparatus.

BACKGROUND

An image reading apparatus that reads a reading surface of a document includes, for example, a platen, a copyholder, and a reading unit. The copyholder includes a transparent flat plate and presses a document by the transparent flat plate to hold the document so that the document placed on the platen does not move. The reading unit uses light penetrating the transparent flat plate from the reading surface of the document that is pressed by the transparent flat plate, to read the reading surface (see, for example, Japanese Laid-open Patent Publication No. 63-31268).

A service for computerizing various documents has been widely developed. For example, even in the image reading apparatus described above, albums, long accordion documents, and large documents exemplified by a handscroll may move or fall off due to the weight of a portion protruding from the platen. Thus, the image reading apparatus cannot hold the document appropriately.

SUMMARY

According to an aspect of the embodiments, an image reading apparatus includes a platen, a copyholder pressed against a reading surface of a document placed on the platen, and a placing part movably provided, on which a non-pressed portion of the document that is not pressed by the copyholder is placed.

The object and advantages of the technique will be realized and attained by means of the elements and combinations particularly pointed out in the claims.

It is to be understood that both the foregoing general description and the following detailed description are exemplary and explanatory and are not restrictive of the technique, as claimed.

BRIEF DESCRIPTION OF DRAWINGS

FIG. 3 is a front elevation depicting a placing part according to the first embodiment.

FIG. 4 is a side view depicting a platen according to the first embodiment.

DESCRIPTION CF EMBODIMENTS

Preferred embodiments of the present invention will be explained with reference to accompanying drawings. Note that the present disclosure is not limited by this embodiment. Embodiments of an image reading apparatus disclosed in the present application will be explained below in detail with reference to the accompanying drawings. The technique is not limited to the embodiments. In addition, identical constituent members, configurations having identical functions, and steps at which identical processes are performed are denoted by like reference signs and redundant explanations thereof are omitted.

First Embodiment

Configuration of Image Reading Apparatus

Figure 1:
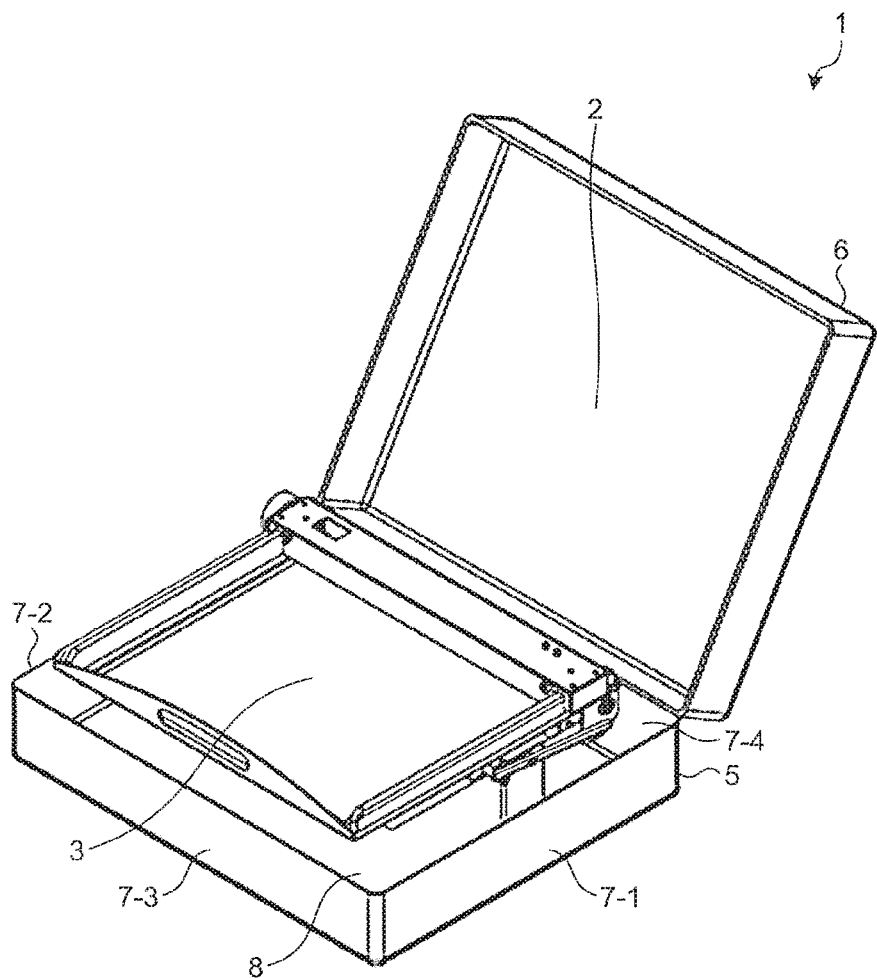
FIG. 1 is a perspective view depicting an image reading apparatus according to a first embodiment.

FIG. 1 is a perspective view depicting an image reading apparatus according to a first embodiment. As depicted in FIG. 1, an image reading apparatus 1 includes a case 2 together with an image reading apparatus body 3. The case 2 includes a case body 5 and a lid 6. The case body 5 includes a right-side side part 7-1, a left-side side part 7-2, a front-side side part 7-3, a rear-side side part 7-4, and a bottom 8.

The bottom. 8 is formed in an oblong plate shape. The right-side side part 7-1 is formed in an oblong plate shape and bonded to an edge of the bottom 8 so as to extend along a flat surface vertical to a flat surface along which the bottom 8 extends. The left-side side part 7-2 is formed in a plate shape substantially identical to that of the right-side side part 7-1, and bonded to an edge of the bottom 8 opposite to the edge to which the right-side side part 7-1 is bonded to face the right-side side part 7-1, that is, so as to extend along a flat surface parallel to the flat surface along which the right-side side part 7-1 extends. The front-side side part 7-3 is formed in an oblong plate shape and bonded to an edge of the right-side side part 7-1, an edge of the left-side side part 7-2, and an edge of the bottom 8 so as to be vertical to the right-side side part 7-1 and the left-side side part 7-2 and to extend along a flat surface vertical to the bottom 8. The rear-side side part 7-4 is formed in a plate shape substantially identical to that of the front-side side part 7-3. The rear-side side part 7-4 is arranged to face the front-side side part 7-3, that is, to extend along a parallel plane parallel to the front-side side part 7-3. The rear-side side part 7-4 is bonded to an edge of the right-side side part 7-1 opposite to the edge thereof to which the front-side side part 7-3 is bonded, to an edge of the left-side side part 7-2 opposite to the edge thereof to which the front-side side part 7-3 is bonded, and to an edge of the bottom 8 opposite to the edge to which the front-side side part 7-3 is bonded. Thus, the case body 5 is formed in a box shape with an opening by being formed of the right-side side part 7-1, the left-side side part 7-2, the front-side side part 7-3, the rear-side side part 7-4, and the bottom 8.

The lid 6 is formed in a box shape with an opening in the same manner as the case body 5, and the opening thereof is formed to match with the opening of the case body 5. The lid 6 is rotatably supported by an edge of the rear-side side part 7-4, opposite to the edge of the case body 5 to which the bottom 8 is bonded. The lid 6 is rotated to open and close the opening of the case body 5, and because the opening of the lid 6 matches with the opening of the case body 5, the interior of the case 2 is isolated from outside.

Figure 2:
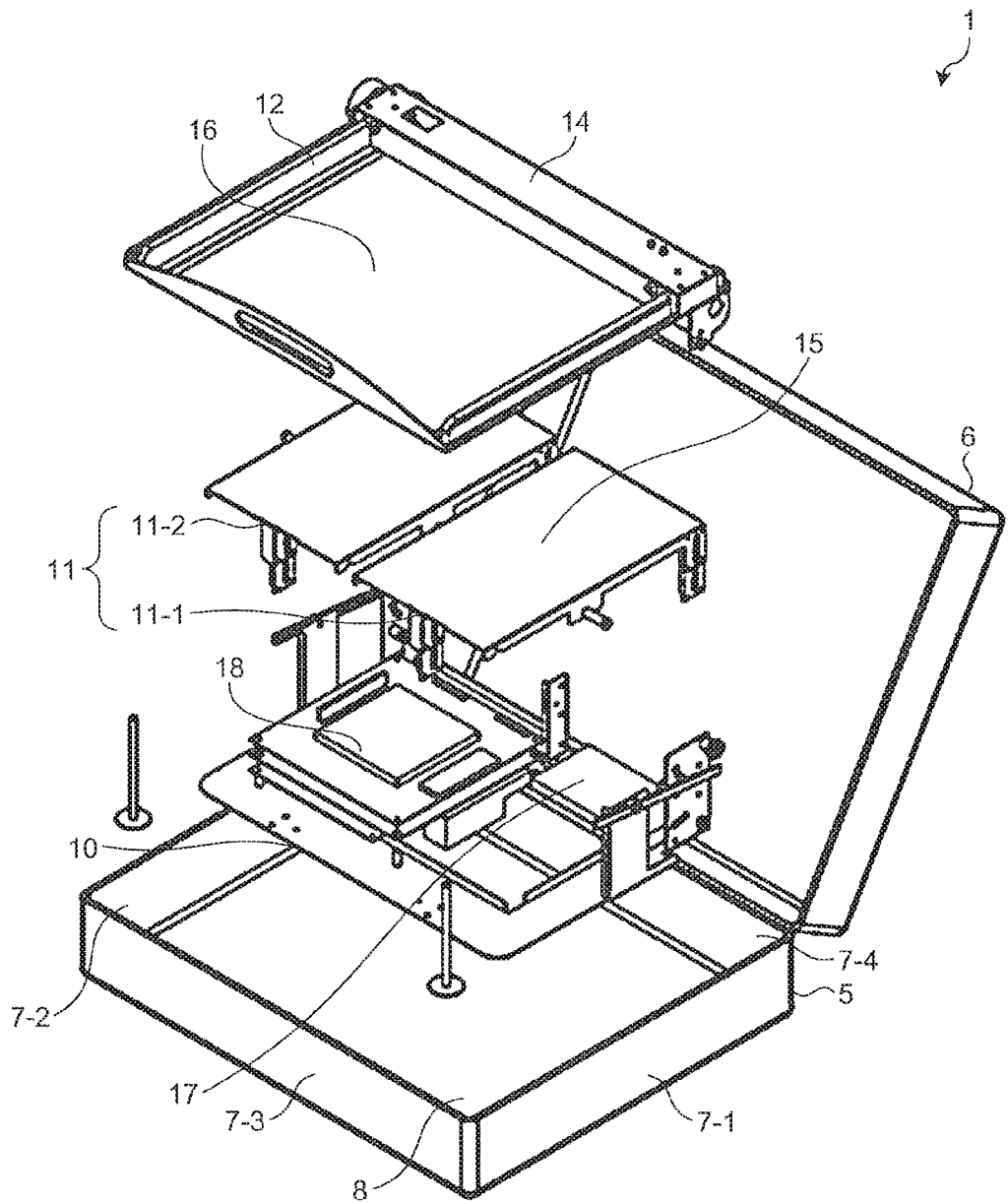
FIG. 2 is an exploded perspective view depicting the image reading apparatus according to the first embodiment.

FIG. 2 is an exploded perspective view depicting the image reading apparatus according to the first embodiment. The image reading apparatus body 3 is arranged inside the case 2. The image reading apparatus body 3 includes, as depicted in FIG. 2, a base 10, a platen 11, a copyholder 12, and a reading unit 14. The base 10 is a arranged inside the case 2 and fixed to the bottom 8 of the case 2.

The platen 11 is arranged so that the base 10 is arranged between the platen 11 and the bottom 8 of the case 2, that is, arranged above the base 10 when the bottom 8 of the case 2 is placed on a horizontal plane, and is supported by the base 10. The platen 11 includes right-side platen 11-1 and a left-side platen 11-2. The right-side platen 11-1 is arranged on the side near the right-side side part 7-1. The left-side platen 11-2 is arranged between the right-side platen 11-1 and the left-side side part 7-2, that is, arranged on the side near the left-side side part 7-2.

The copyholder 12 is arranged above the platen 11 so that the platen 11 is arranged between the base 10 and the copyholder 12 and is supported by the base 10. The reading unit 14 is arranged above the copyholder 12 so that the copyholder 12 is arranged between the reading unit 14 and the platen 11 and is supported by the copyholder 12 so as to be able to perform parallel movement.

The image reading apparatus body 3 further includes a power supply unit 17 and a controller 18. The power supply unit 17 and the controller 18 are respectively arranged between the base 10 and the platen 11 and fixed to the base 10.

Configuration of Platen Auxiliary Jig

FIG. 3 is a front elevation depicting a placing part according to the first embodiment. The image reading apparatus 1 further includes a platen auxiliary jig 21, as depicted in FIG. 3. The platen auxiliary jig 21 is formed in a columnar shape, designating a depth direction of the document plane as an axis and includes a placing part 22 and an attaching part 23. The placing part 22 is formed with a placing surface 25 which extends in the depth direction of the document plane and is flat. The attaching part 23 is integrally bonded with the placing part 22. The attaching part 23 is hooked by the left-side side part 7-2 of the case 2, to fix the placing part 22 to the base 10 via the case 2. At this time, the placing part 22 is formed so that the placing surface 25 is inclined when being fixed to the base 10 by the attaching part 23. That is, the placing part 22 is formed so that a height of a region 27 of the placing surface 25 on the side far from the platen 11 becomes higher than that of a region 26 of the placing surface 25 near the platen 11 than the region 27.

When a document placed on the platen 11 protrudes from the platen. 11, the protruding portion is placed on the placing part 22 of the platen auxiliary jig 21. The image reading apparatus 1 can prevent the document from falling off or moving due to the own weight of the protruding portion by placing the protruding portion on the placing part 22 and can hold the document appropriately.

The platen auxiliary jig 21 can be formed by arranging a plurality of plates having identical shapes in the depth direction of the document plane and bonding the plates with each other by a coupling rod. The platen auxiliary jig 21 can be also formed of one plate. The platen auxiliary formed in this manner can also prevent a document from moving or falling off due to the own weight of the protruding portion by placing the portion protruding from the platen 11 on an upper edge of the plate.

Further, the placing part 22 is inclined to become higher as the placing surface 25 moves away from the platen 11, thereby preventing a non-pressed portion of a document placed on the placing part 22 from rolling off or slipping toward the side far from the platen 11.

Because the right-side side part 7-1 and the front-side side part 7-3 of the case 2 are formed in a plate shape similarly to the left-side side part 7-2, the platen auxiliary jig 21 can be hooked and fixed by the right-side side part 7-1 or the front-side side part 7-3.

In a state in which the platen auxiliary jig 21 is attached to the left-side side part 7-2, if the case body 5 is to be closed by the lid 6 of the case 2, the platen auxiliary jig 21 interferes with the lid 6. In the image reading apparatus 1, the lid 6 of the case 2 can be closed by detaching the platen auxiliary jig 21 from the left-side side part 7-2 of the case 2, thereby making the image reading apparatus 1 compact. When the platen auxiliary jig 21 is detached from the left-side side part 7-2 of the case 2, the platen auxiliary jig 21 can be housed in the case 2 together with the image reading apparatus body 3. The case 2 is formed to be able to house both the image reading apparatus body 3 and the platen auxiliary jig 21 in the interior of the case 2 surrounded by the case body 5 and the lid 6. The image reading apparatus 1 can be made more compact than being in the state in which the platen auxiliary jig 21 is attached to the case 2 and can be carried easily with no need to carry the platen auxiliary jig 21 and the image reading apparatus body 3 separately.

Configuration of Platen

FIG. 4 is a side view depicting the platen according to the first embodiment. As depicted in FIG. 4, the right-side platen 11-1 includes a platen body 30, a base-side rear-side support member 31, and a base-side front-side support member 32. The platen body 30 is formed in an oblong plate shape and a flat placing surface 15 is formed thereon (see FIG. 2). The platen body 30 is arranged above the base 10 so that the base 10 is arranged between the platen body 30 and the bottom 8 of the case 2. The platen body 30 is arranged so that the placing surface 15 extends along a flat surface parallel to a horizontal surface where the bottom 8 of the case 2 is placed, and the placing surface 15 faces the side opposite to the base 10.

The base-side rear-side support member 31 is arranged to project upward from the base 10 and is fixed to the base 10. A rear-side upside sliding roller 33 and a rear-side downside sliding roller 34 are formed in the base-side rear-side support member 31. The rear-side upside sliding roller 33 is formed of a bearing. The rear-side upside sliding roller 33 is rotatably supported by a shaft projecting from a surface of the base-side rear-side support member 31 facing the right-side side part 7-1 of the case 2 toward the right-side side part 7-1. The rear-side downside sliding roller 34 is formed of a bearing. The rear-side downside sliding roller 34 is arranged on the lower side of the rear-side upside sliding roller 33 by a predetermined distance L and is rotatably supported by a shaft projecting from a surface of the base-side rear-side support member 31 facing the right-side side part 7-1 of the case 2 toward the right-side side part 7-1 of the case 2.

The base-side front-side support member 32 is arranged on the side closer to the front-side side part 7-3 of the case 2 than the base-side rear-side support member 31 to project upward from the base 10 and is fixed to the base 10. A front-side upside sliding roller 35 and a front-side downside sliding roller 36 are formed in the base-side front-side support member 32. The front-side upside sliding roller 35 is formed of a bearing. The front-side upside sliding roller 35 is rotatably supported by a shaft projecting from a surface of the base-side front-side support member 32 facing the right-side side part 7-1 of the case 2 toward the right-side side part 7-1. The front-side downside sliding roller 36 is formed of a bearing. The front-side downside sliding roller 36 is arranged on the lower side of the front-side upside sliding roller 35 by the predetermined distance L and is rotatably supported by a shaft projecting from a surface of the base-side front-side support member 32 facing the right-side side part 7-1 of the case 2 toward the right-side side part 7-1.

The right-side platen 11-1 further includes a platen-side rear-side support member 38, a platen-side front-side support member 39, and a torsion coil spring 40. The platen-side rear-side support member 38 is formed in a plate shape. The platen-side rear-side support member 38 is arranged to project downward from the platen body 30 along a flat surface parallel to the right-side side part 7-1 of the case 2 and is fixed to the platen body 30. A rear-side upside slide groove 41 and a rear-side downside slide groove 42 are formed in the platen-side rear-side support member 38. The rear-side upside slide groove 41 is formed to extend along a straight line vertical to the is fitted with the rear-side upside sliding roller 33 and guides the rear-side upside sliding roller 33 to perform parallel movement in a direction vertical to the placing surface 15. The rear-side downside slide groove 42 is arranged on the side closer to the base 10 than the rear-side upside slide groove 41 and is formed to extend along a straight line vertical to the placing surface 15. The rear-side downside slide groove 42 is fitted with the rear-side downside sliding roller 34 and guides the rear-side downside sliding roller 34 to perform parallel movement in the direction vertical to the placing surface 15.

The platen-side front-side support member 39 is formed in a plate shape. The platen-side front-side support member 39 is arranged on the side closer to the front-side side part 7-3 of the case 2 than the platen-side rear-side support member 38 to project downward from the platen body 30 along the flat surface parallel to the right-side side part 7-1 of the case 2 and is fixed to the platen body 30. A front-side upside slide groove 43 and a front-side downside slide groove 44 are formed in the platen-side front-side support member 39. The front-side upside slide groove 43 is formed to extend along a straight line vertical to the placing surface 15. The front-side upside slide groove 43 is fitted with the front-side upside sliding roller 35 and guides the front-side upside sliding roller 35 to perform parallel movement in the direction vertical to the placing surface 15. The front-side downside slide groove 44 is arranged on the side closer to the base 10 than the front-side upside slide groove 43 and is formed to extend along a straight line parallel to a vertical direction. The front-side downside slide groove 44 is formed to extend along a straight line vertical to the placing surface 15. The front-side downside slide groove 44 is fitted with the front-side downside sliding roller 36 and guides the front-side downside sliding roller 36 to perform parallel movement in the direction vertical to the placing surface 15.

The torsion coil spring 40 is formed of an elastic body and is formed in a bent bar shape. The torsion coil spring 40 is fixed to the base-side rear-side support member 31 at one end, and the other end abuts on the surface of the platen body 30 on, the side of the base 10. The torsion coil spring 40 applies an elastic force to the platen body 30 so that the platen body 30 moves away from the base 10, that is, the platen body 30 is pushed upward.

Therefore, in the right-side platen 11-1, the platen body 30 is supported by the base 10 so that the placing surface 15 performs parallel movement in the vertical direction. In the right-side platen 11-1, because the rear-side upside sliding roller 33 and the rear-side downside sliding roller 34 are away from each other by the distance L, when the placing surface 15 moves in the vertical direction, inclination of the placing surface 15 is prevented. In the right-side platen 11-1, further, when a downward force is not applied to the platen body 30, the platen body 30 is supported by the base 10 so that the placing surface 15 is arranged at a predetermined upper end position. Further, in the right-side platen 11-1, when a downward force is applied to the platen body 30, the placing surface 15 moves downward by a distance corresponding to the force. The rear-side upside sliding roller 33, the rear-side downside sliding roller 34, the front-side upside sliding roller 35, and the front-side downside sliding roller 36 can be replaced by a resin roller made of resin. Even if the rear-side upside sliding roller 33, the rear-side downside sliding roller 34, the front-side upside sliding roller 35, and the front-side downside sliding roller 36 are replaced by a resin roller, the right-side platen 11-1 can similarly prevent the placing surface 15 from inclining.

The left-side platen 11-2 is formed in the same manner as the right-side platen 11-1, so that the left-side platen 11-2 is plane-symmetrical to the right-side platen 11-1 with respect to a symmetric face being parallel to the right-side side part 7-1 and the left-side side part 7-2. That is, in the left-side platen 11-2, the platen body is supported by the base 10 to perform parallel movement in the vertical direction. In the left-side platen 11-2, further, when a downward force is not applied to the platen body of the left-side platen 11-2, the left-side platen 11-2 is formed so that the placing surface thereof extends along the flat surface along the placing surface 15 of the right-side platen 11-1, in which the downward force is not applied to the platen body 30.

Because the platen 11 includes the right-side platen 11-1 and the left-side platen 11-2, when a double-page book is placed on the platen 11, right pages of the book can be placed on the right-side platen 11-1, and left pages of the book can be placed on the left-side platen 11-2. Therefore, even if the thickness of the right pages of the book is different from the thickness of the left pages, the book can be placed on the platen 11 so that a reading surface of the right page and a reading surface of the left page are arranged on the same plane.

Configuration of Copyholder

Figure 5:
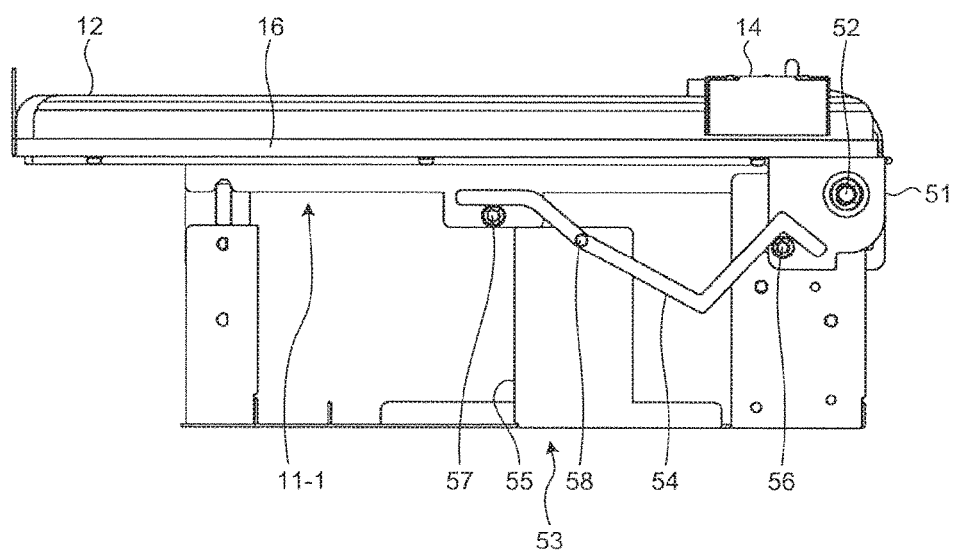
FIG. 5 is a side view depicting a copyholder according to the first embodiment and an interlocking mechanism.

FIG. 5 is a side view depicting a copyholder according to the first embodiment and an interlocking mechanism. The copyholder 12 includes, as depicted in FIG. 5, a transparent flat plate 16 and a support member 51 (see FIG. 2). The transparent flat plate 16 is formed of a material that transmits light exemplified by visible light and is formed in an oblong plate shape. The support member 51 is fixed to the transparent flat plate 16. The support member 51 is supported by the base 10 rotatably around a rotary axis 52 and supports the transparent flat plate 16 on the base 10 rotatably around the rotary axis 52. The rotary axis 52 is parallel to the placing surface 15, and parallel to a flat surface along which the rear-side side part 7-4 of the case 2 extends, that is, parallel to a direction in which the left-side platen 11-2 and the right-side platen 11-1 are aligned.

Configuration of Interlocking Mechanism

The image reading apparatus body 3 also includes an interlocking mechanism 53, as depicted in FIG. 5. The interlocking mechanism 53 includes a link 54, a fulcrum base 55, a point of effort 56, and a point of load 57. The link 54 is formed of a bent bar. The fulcrum base 55 is fixed on the base 10. The fulcrum base 55 supports the link 54 rotatably around a rotary axis 58. The rotary axis 58 is arranged to be parallel to the rotary axis 52, and below the platen body 30 so that the rotary axis 58 is arranged at all times below a flat surface along which the placing surface 15 of the platen body 30 extends. The point of effort 56 is formed in a projection projecting from a part of the support member 51 of the copyholder 12 toward the right-side side part 7-1. The point of effort 56 pushes one end of the link 54 upward when the copyholder 12 rotates around the rotary axis 52 so that the transparent flat plate 16 moves away from the placing surface 15 of the platen 11. The point of load 57 is formed in a projection projecting from a surface of a member facing the right-side side part 7-1, which protects from a lower part of the platen body 30 of the platen 11, toward the right-side side part 7-1. When the copyholder 12 rotates around the rotary axis 52, the link 54 rotates around the rotary axis 58 to press the point of load 57 downward by one end opposite to the other end that is pushed upward by the point of effort 56 of the link 54.

Therefore, the interlocking mechanism 53 presses the placing surface 15 of the right-side platen 11-1 downward, when the copyholder 12 rotates around the rotary axis 52 so that the transparent flat plate 16 moves away from the placing surface 15.

Figure 6:
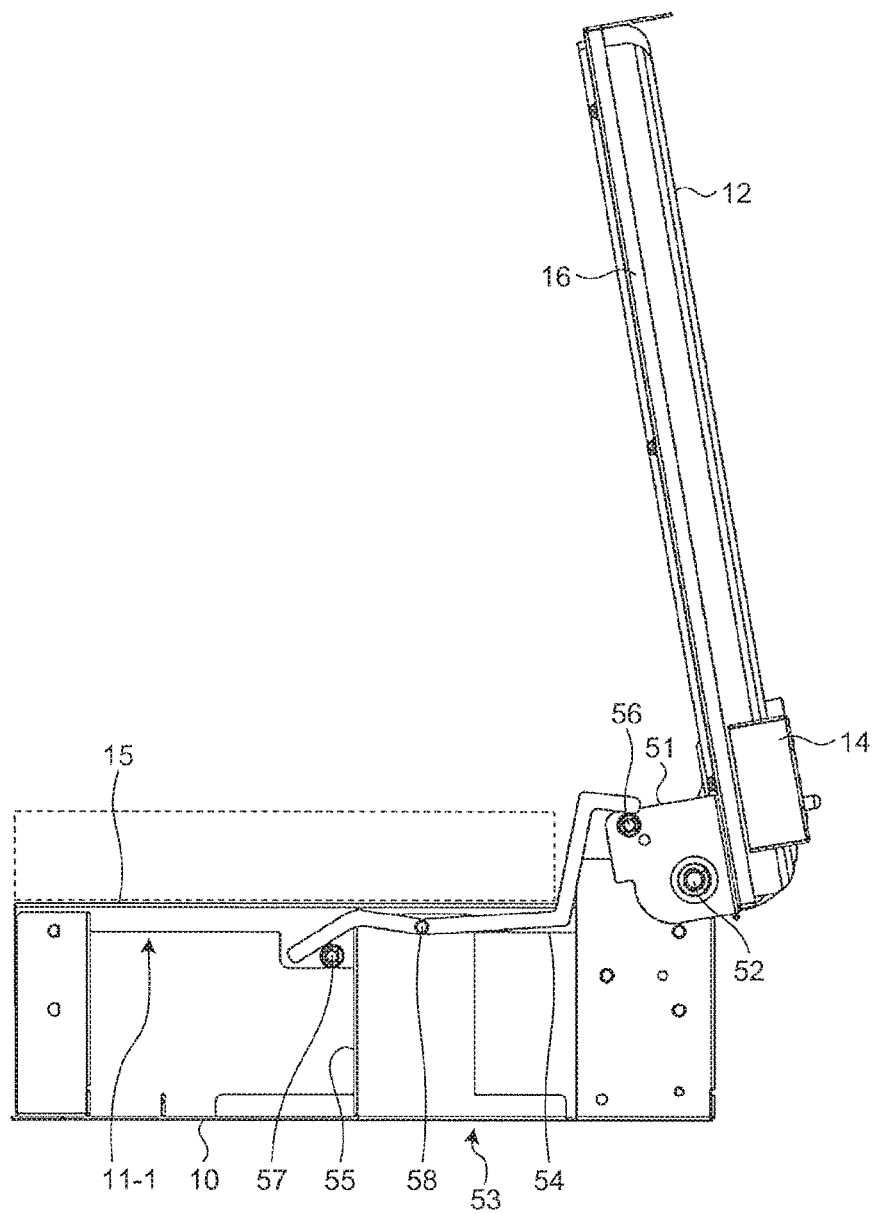
FIG. 6 is a side view depicting the platen and the interlocking mechanism when the copyholder according to the first embodiment is opened.

FIG. 6 is a side view depicting the platen and the interlocking mechanism when the copyholder according to the first embodiment is opened. More specifically, FIG. 6 depicts a state in which the copyholder 12 is opened by rotating around the rotary axis 52 so that the transparent flat plate 16 moves away from the placing surface 15 of the right-side platen 11-1. At this time, the interlocking mechanism 53 lowers the platen body 30 so that the placing surface 15 of the right-side platen 11-1 is arranged at a position lower than the height at which the placing surface 15 of the right-side platen 11-1 has been arranged in a state in which the copyholder 12 is closed as depicted in FIG. 5.

The link 54 of the interlocking mechanism 53 is arranged in such a manner that the point of load 57 and the rotary axis 58 are arranged on the lower side than the position where the placing surface 15 is arranged, in a state which the copyholder 12 is closed. Therefore, the ink 54 of the interlocking mechanism 53 can be formed so as not be arranged at a position higher than a surface extended from the placing surface 15 in an axial direction of the rotary axis 52 at all times, when the copyholder 12 is opened or closed. The interlocking mechanism 53 is prevented from interfering with a document placed on the right-side platen 11-1, because the interlocking mechanism 53 is not arranged at the position higher than the surface extended from the placing surface 15 in the direction of the rotary axis 52.

By forming the interlocking mechanism 53 in this manner, when the copyholder 12 is closed, the transparent flat plate 16 can approach the platen 11 with an angle substantially parallel to the placing surface of the platen 11. In the image reading apparatus 1, because the transparent flat plate 16 approaches the platen 11 with the angle substantially parallel to the placing surface of the platen 11, the transparent flat plate 16 of the copyholder 12 can come into contact with the reading surface of a document placed on the platen 11 with the angle substantially parallel thereto. Therefore, the image reading apparatus 1 can prevent that a document crinkles when the transparent flat plate 16 of the copyholder 12 is pressed against the document.

The interlocking mechanism 53 mechanically converts rotary motion to rotate the copyholder 12 to up and down motion to move the platen body 30 of the platen 11 up and down, thereby lifting the platen body 30 without using power, which is power saving. The interlocking mechanism 53 can reduce load of the power supply unit 17 as compared with other interlocking mechanisms that move the platen body 30 up and down by electrical power. Therefore, the image reading apparatus 1 including the interlocking mechanism 53 can read more documents with one charge of the power supply unit 17.

The image reading apparatus body 3 also includes another interlocking mechanism (not depicted). The interlocking mechanism is formed in the same manner as the interlocking mechanism 53, and when the copyholder 12 is opened, moves the placing surface of the left-side platen 11-2 downward. The interlocking mechanism is formed not to be arranged above a surface extended from the placing surface of the left-side platen 11-2 in the direction of the rotary axis 52, when the copyholder 12 is closed, and not to interfere with a document placed on the left-side platen 11-2.

Configuration of Image Reading Apparatus

Figure 7:
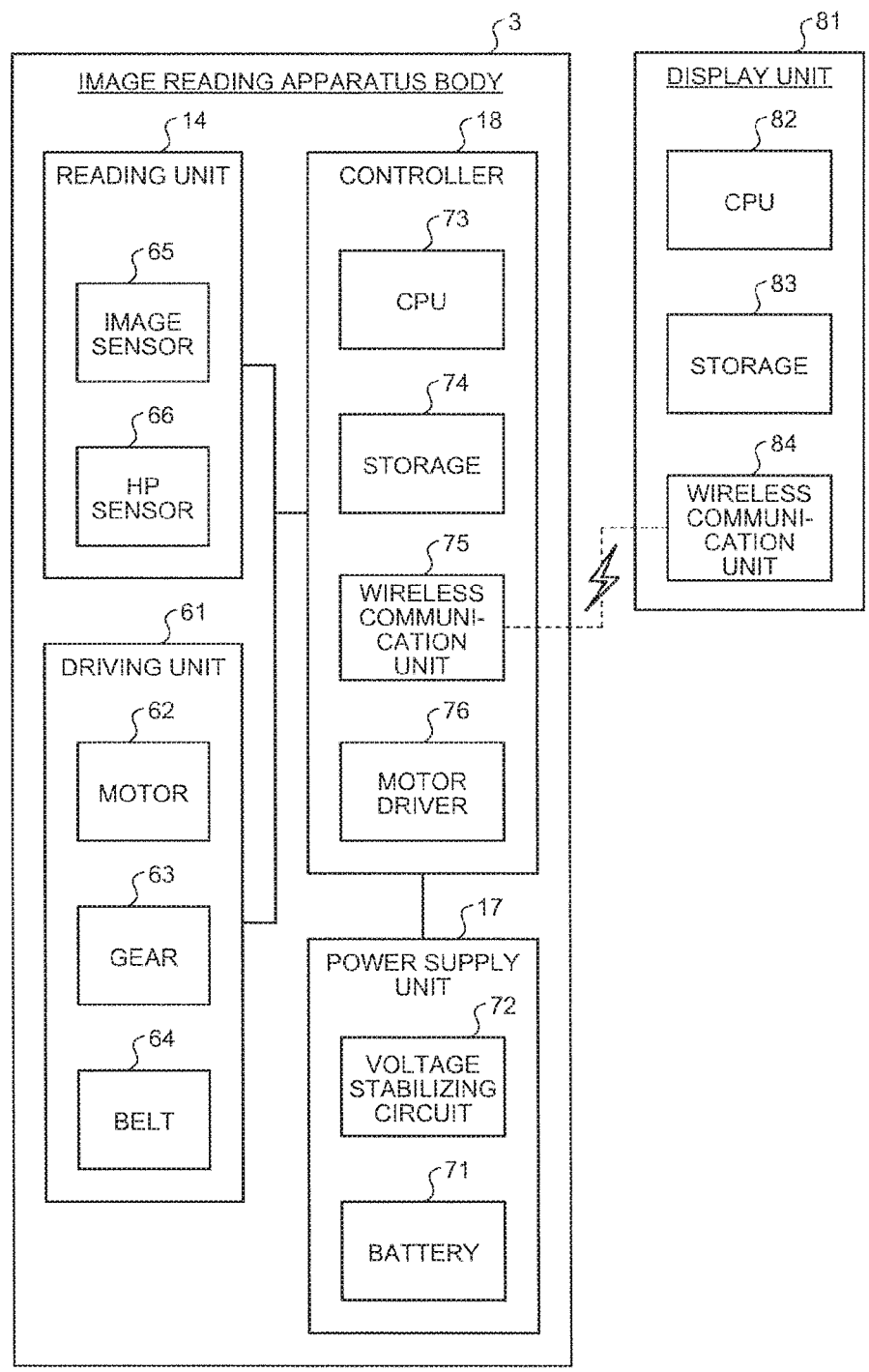
FIG. 7 is a block diagram depicting the image reading apparatus according to the first embodiment.

FIG. 7 is a block diagram depicting the image reading apparatus according to the first embodiment. The image reading apparatus 1 includes, as depicted in FIG. 7, the reading unit 14, the power supply unit 17, the controller 18, a driving unit 61, and a display unit 81. The driving unit 61 supports the reading unit 14 on the copyholder 12 to be able to perform parallel movement in a sub-scanning direction. The sub-scanning direction is parallel to the transparent flat plate 16 and is vertical to the rotary axis 52 of the copyholder 12. The driving unit 61 includes a motor 62, gears 63, and a belt 64. The motor 62 is controlled by the controller 18 to rotate the gears 63 by using power supplied from outside. The belt 64 is formed in a belt shape, one part thereof surrounds the gears 63, and another part is bonded to the reading unit 14. The gears 63 are rotated by the motor 62 to move the belt 64, thereby moving the reading unit 14 in parallel to the sub-scanning direction. That is, the driving unit 61 is controlled by the controller 18 to move the reading unit 14 in parallel to the sub-scanning direction.

The reading unit 14 includes an image sensor 65 and a home position (HP) sensor 66. The image sensor 65 is formed of a contact image sensor (CIS)-type image sensor. The image sensor 65 is formed in a linear shape and is arranged on a surface of the reading unit 14 facing the transparent flat plate 16 so as to extend along a straight line parallel to a main scanning direction vertical to the sub-scanning direction along which the reading unit 14 moves. The image sensor 65 is controlled by the controller 18 to irradiate light to a linear reading line parallel to the main scanning direction on the reading surface to be read, against which the transparent flat plate 16 is being pressed, via the transparent flat plate 16. The image sensor 65 receives flight reflected by the reading line via the transparent flat plate 16. The image sensor 65 also detects the received light and outputs image information indicating a detection result to the controller 18. The HP sensor 66 is controlled by the controller 18 to detect whether the reading unit 14 is arranged at a home position near the rotary axis 52 of the copyholder 12, of a movable range of the reading unit 14. The HP sensor 66 also outputs a detection result to the controller 18.

The power supply unit 17 includes a battery 71 and a voltage stabilizing circuit 72. The battery 71 is connected to the voltage stabilizing circuit 72 and supplies direct-current power to the voltage stabilizing circuit 72. The voltage stabilizing circuit 72 is connected to the controller 18, to stabilize power supplied from the battery 71 to have a voltage of a certain value and to supply the stabilized power to the controller 18.

The controller 18 is a so-called "computer" and includes a central processing unit (CPU) 73, a storage 74, a wireless communication unit 75, and a motor driver 76. The CPU 73 executes a computer program installed in the controller 18 to control the storage 74, the wireless communication unit 75, and the motor driver 76, and also controls the reading unit 14 and the driving unit 61. The storage 74 records the computer program and temporarily records information created by the CPU 73. The wireless communication unit 75 is controlled by the CPU 73 to output information received from an external device via wireless communication and to output the information created by the CPU 73 to tan external device via wireless communication. The motor driver 76 is controlled by the CPU 73 to supply predetermined power of the power supplied from the power supply unit 17 to the motor 62 of the driving unit 61, thereby moving the reading unit 14 at a predetermined speed by a predetermined distance.

The controller 18 controls the HP sensor 66 to detect whether the reading unit 14 is arranged at the home position when the image reading apparatus 1 is activated or reading by the reading unit 14 is complete. If the reading unit 14 is not arranged at the home position, the controller 18 controls the driving unit 61 so that the reading unit 14 approaches the rotary axis 52 of the copyholder 12. Upon reception of a reading instruction from the display unit 81, the controller 18 controls the driving unit 61 so that the reading unit 14 moves from the home position in the sub-scanning direction at a predetermined speed. When the reading unit 14 is moving at the predetermined speed, the controller 18 controls the reading unit 14 to read a plurality of reading lines filled on the reading surface, against which the transparent flat plate 16 is being pressed, of a document placed on the platen 11. The controller 18 creates a two-dimensional image copying the reading surface based on a plurality of pieces of image information respectively indicating the reading lines read by the reading unit 14 and transmits the created image to the display unit 81.

The display unit 81 is a so-called "computer", includes a CPU 82, a storage 83, and a wireless communication unit 84, and also includes an input/output device (not depicted). The CPU 82 executes a computer program installed in the controller 18 to control the storage 83 and the wireless communication unit 84. As the display unit 81, a tablet personal computer (PC), tablet terminal, and a smartphone are exemplified.

When a user inputs predetermined information to the display unit 81, the display unit 81 transmits predetermined start information to the image reading apparatus 1 via wireless communication. The display unit 81 receives an image transmitted from the image reading apparatus 1 via wireless communication, records the received image in the storage 83, and displays the received image on the input/output device.

Operation of Image Reading Apparatus

Figure 8:
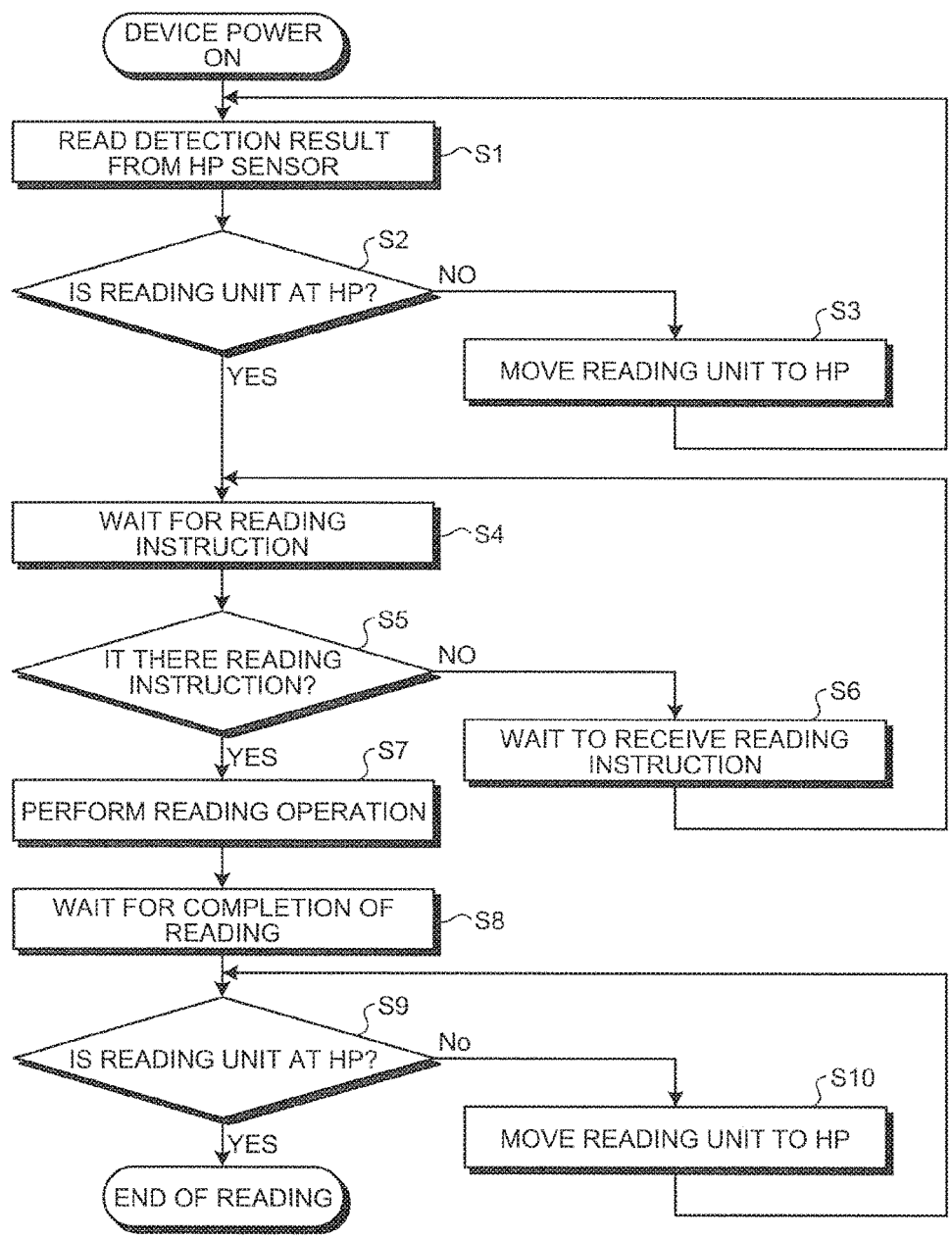
FIG. 8 is a flowchart depicting an operation of the image reading apparatus according to the first embodiment.

FIG. 8 is a flowchart depicting an operation of the image reading apparatus according to the first embodiment. First, a user carries the image reading apparatus 1 to a workplace where a workbench is installed, in a state in which the image reading apparatus body 3 and the platen auxiliary jig 21 are housed in the case 2 in the image reading apparatus 1. At this time, the user can carry the platen auxiliary jig 21 together with the image reading apparatus body 3, because both the image reading apparatus body 3 and the platen auxiliary jig 21 are housed in the case 2 in the image reading apparatus 1. At this time, the image reading apparatus 1 can be carried more easily, as compared with carrying the platen auxiliary jig 21 and the image reading apparatus body 3 separately. It is difficult to bring out large books, heavy books, and books for in-library use, which are banned to be taken out of a library to outside, from a storage site where the books are stored to a place where the image reading apparatus 1 is set. Because the image reading apparatus 1 is compact and can be carried easily, the image reading apparatus 1 can be brought into the storage site where such books are stored to computerize these hooks easily.

After carrying the image reading apparatus 1 to the workplace, the user places the image reading apparatus 1 on the workbench, with the bottom 8 of the case 2 facing downward. After placing the image reading apparatus 1, the user opens the lid 6 of the case 2 to expose the image reading apparatus body 3, and switches on the image reading apparatus 1 by operating the image reading apparatus 1. When the image reading apparatus 1 is switched on and activated by an operation of the user, the controller 18 controls the HP sensor 66 to determine whether the reading unit 14 is arranged at the home position (Step S1). If the reading unit 14 is not arranged at the home position (NO at Step S2), the controller 18 controls the driving unit 61 so that the reading unit 14 approaches the rotary axis 52 (Step S3). The controller 18 repeatedly performs the processes from Step S1 to Step S3, until the controller 18 determines that the reading unit 14 is arranged at the home position. When determining that the reading unit 14 is arranged at the home position (YES at Step S2), the controller 10 transits to a mode for waiting for a reading instruction (Step S4).

After transiting to the mode for waiting for a reading instruction, the controller 18 determines whether a reading instruction is received from the display unit 81 via wireless communication (Step S5). If the reading instruction is not received (NO at Step S5), the controller 18 waits until the reading instruction is received (Step S6), and repeatedly performs the process of determining whether a reading instruction transmitted from the display unit 81 is received (Step S5).

After the reading unit 14 is arranged at the home position, the user rotates the copyholder 12 so that the transparent flat plate 16 moves away from the placing surface 15 of the platen 11 to open the copyholder 12. After opening the copyholder 12, the user places a prepared document on the platen 11 so that a desired reading surface faces upward. When there is a portion being not placed on the platen 11 and protruding therefrom in the document, the user arranges the placing part 22 of the platen auxiliary jig 21 to an appropriate position. The user hooks the attaching part 23 of the platen auxiliary jig 21 to either one of the right-side side part 7-1, the left-side side part 7-2, and the front-side side part 7-3, to fix the platen auxiliary 21 to the base 10. After fixing the platen auxiliary jig 21 to the base 10, the user places the prepared document on the placing surface 15 of the platen so that the desired reading surface faces upward, and places the protruding portion on the placing part 22. After appropriately placing the document on the placing surface 15 of the platen 11, the user rotates the copyholder 12 so that the reading surface of the document is pressed against the transparent flat plate 16 of the copyholder 12 and closes the copyholder 12. Because the copyholder 12 is closed, the portion of the document placed on the platen 11 is appropriately held on the platen 11 by an elastic force of the torsion coil spring 40 of the platen 11, to prevent the portion placed on the platen 11 from moving.

At this time, because the portion of the document protruding from the platen 11 is placed on the placing part 22 of the platen auxiliary jig 21, the user does not need to support the protruding portion. Because the placing surface 25 of the placing part 22 of the platen auxiliary jig 21 is inclined, the portion of the document placed on the placing part 22 can be prevented from rolling off or slipping toward the side far from the platen 11.

After having closed the copyholder 12, the user inputs predetermined information to the display unit 81 by using the input/output device of the display unit 81 so that the display unit 81 transmits a reading instruction. Upon input of the predetermined information from the user, the display unit 81 transmits a reading instruction to the image reading apparatus 1 via wireless communication.

Upon reception of the reading instruction (YES at Step S5), the controller 18 performs a reading operation (Step S7), and transits to a mode for waiting for completion of reading (Step S8). That is, the controller 18 controls the driving unit 61 to move the reading unit 14 in parallel to the sub-scanning direction at a predetermined speed. The controller 18 controls the reading unit 14 while moving at the predetermined speed, to read each of the reading lines tightly filled on the reading surface, to create a plurality of pieces of image information respectively indicating the reading lines.

Even at this time, because a portion of the document is placed on the placing part 22 of the platen auxiliary jig 21, the image reading apparatus 1 prevents the document from moving while the reading unit 14 is reading the reading lines.

When having read all the reading lines, the controller 18 creates an image copying the reading surface based on the pieces of image information and transmits the image to the display unit 81 via wireless communication. Upon reception of the image via wireless communication, the display unit 81 records the image in the storage 83 and displays the image on the input/output device.

After completion of the reading operation, the controller 18 controls the HP sensor 66 to determine whether the reading unit 14 is arranged at the home position (Step S9). If the reading unit 14 is not arranged at the home position (NO at Step S9), the controller 18 controls the driving unit 61 so that the reading unit 14 approaches the rotary axis 52 (Step S10). The controller 18 repeatedly performs the processes from Step S9 to Step S10, until the controller 18 determines that the reading unit 14 is arranged at the home position.

When determining that the reading unit 14 is arranged at the home position. (YES at Step S9), the controller 18 transits to the mode for waiting for a reading instruction again at Step S4.

At Step S5, the controller 18 can start the reading operation at Step S7 by a trigger other than the reading instruction from the display unit 81. For example, the controller 18 can perform the reading operation when detecting closure of the copyholder 12 in the mode for waiting for a reading instruction.

In this manner, the image reading apparatus 1 includes the platen 11, the copyholder 12 pressed against a reading surface of a document placed on the platen 11, and the placing part 22 provided movably, on which a non-pressed portion of the document which is not pressed by the copyholder 12 is placed. Therefore, the image reading apparatus 1 can place a non-pressed portion of a document protruding from the copyholder 12 on the placing part 22. Even if a document is larger than the platen 11 or the copyholder 12, the image reading apparatus 1 can hold the document appropriately while preventing the document from falling off or moving. The image reading apparatus 1 can make the entire apparatus compact by moving the placing part 22 and can be carried easily as compared with other image reading apparatuses in which the placing part 22 is fixed.

The placing part 22 is formed in such a manner that as a region coming in contact with a non-pressed portion becomes farther from the platen 11, the height thereof becomes higher. Therefore, the image reading apparatus 1 can prevent the non-pressed portion placed on the placing part 22 from rolling off or slipping to the side far from the platen 11.

The interlocking mechanism 53 is formed so as not to intersect with a line connecting the placing surface 15 of the platen 11 on which a document is placed and the placing surface 25 of the placing part 22 coming in contact with the document. Therefore, a document can be appropriately placed on the platen 11 and the placing part 22 so that the interlocking mechanism 53 does not interfere with the document in the image reading apparatus 1.

The image reading apparatus 1 also includes the attaching part 23 for detachably attaching the placing part 22 to the base 10 that supports the platen 11 and the copyholder 12, so that a non-pressed portion of a document is placed on the placing part 22. Therefore, the image reading apparatus 1 can support the non-pressed portion of the document by attaching the placing part 22 to the base 10 and prevent the document from tails of or moving at the time of reading the document. The image reading apparatus 1 can be made compact by detaching placing part 22 from the base 10 and can be carried easily.

The image reading apparatus 1 also includes the case 2 for housing the placing part 22 together with the platen 11 and the copyholder 12. Therefore, by housing the placing part 22 in the case 2, the placing part 22 can be carried together with the image reading apparatus body 3 in the image reading apparatus 1, thus the image reading apparatus 1 can be carried easily.

In the placing part 22 of the image reading apparatus 1 according to the first embodiment, the placing surface 25 is inclined. However, the placing surface 25 does not reed to be inclined, and by placing a document on the placing surface 25, the placing surface 25 can prevent a document from falling off or moving and can hold the document appropriately.

The interlocking mechanism 53 of the image reading apparatus 1 according to the first embodiment can be formed to intersect with the line connecting the placing surface 15 of the platen 11 on which a document is placed and the placing surface of the placing part 22 coming in contact with the document. Even in this case, the image reading apparatus 1 can prevent the document from falling off or moving by placing the document on the placing surface 25 and can hold the document appropriately.

The image reading apparatus 1 according to the first embodiment includes the attaching part 23 for detachably attaching the placing part 22. However, the placing part 22 can be provided so as not be detachable. Even in this case, the image reading apparatus 1 can prevent a document from falling off or moving by placing the document on the placing surface 25 and can hold the document appropriately.

The image reading apparatus 1 according to the first embodiment includes the case 2 for housing the placing part 22 together with the platen 11 and the copyholder 12. However, the case 2 does not need to be provided. Even in the case of not including the case 2, the image reading apparatus 1 can prevent a document from falling off or moving by placing the document on the placing surface 25 and can hold the document appropriately.

Other embodiments are explained below in detail with reference to the drawings.

Second Embodiment

Another Platen

The torsion coil spring 40 of the platen 11 can be formed to abut on a region of the surface other than a central part of the platen body 30 on the side of the base 10. The torsion coil spring 40 of the platen 11 can be replaced by another elastic body that applies an elastic force that pushes the platen body 30 upward to the platen body 30.

Figure 9:
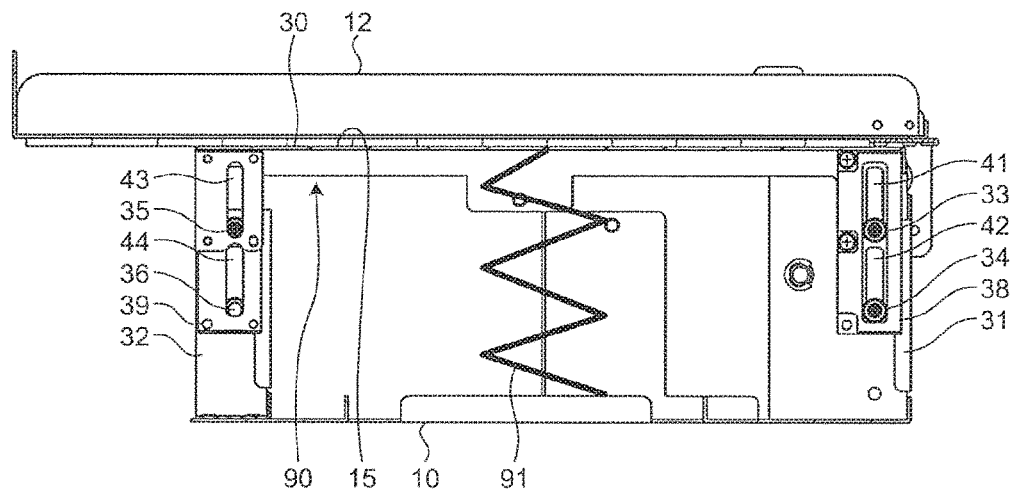
FIG. 9 is a side view depicting a platen according to a second embodiment.

FIG. 9 is a side view depicting a platen according to a second embodiment. FIG. 9 depicts another right-side platen by using such an elastic body. In a right-side platen 90, the torsion coil spring 40 of the right-side platen 11-1 described above is replaced by a compression coil spring 91. The compression coil spring 91 is formed in a coil shape and is arranged between the base 10 and the platen body 30, with one end thereof being bonded to the base 10 and the other end being bonded to the center of a downside surface of the platen body 30. The compression coil spring 91 applies an elastic force to the platen body 30 so that the platen body 30 moves away from the base 10, that is, the platen body 30 is pushed upward. An image reading apparatus, to which such an elastic body is applied, can hold a document appropriately by the elastic force of the elastic body and can read the document appropriately, similarly to the image reading apparatus 1 described above.

In the image reading apparatus, the platen does not need to be formed of the right-side platen 11-1 and the left-side platen 11-2 and can be formed of one platen. An image reading apparatus including one platen can also prevent a document from falling off or moving by providing the placing part describe above and can read the document appropriately, similarly to the image reading apparatus 1.

Third Embodiment

Another Platen Auxiliary Jig

The attaching part 23 of the platen auxiliary jig 21 can be replaced by another attaching part that fixes the placing part 22 to the base 10 by a method different from hooking the placing part 22 to the side part of the case body 5.

Figure 10:
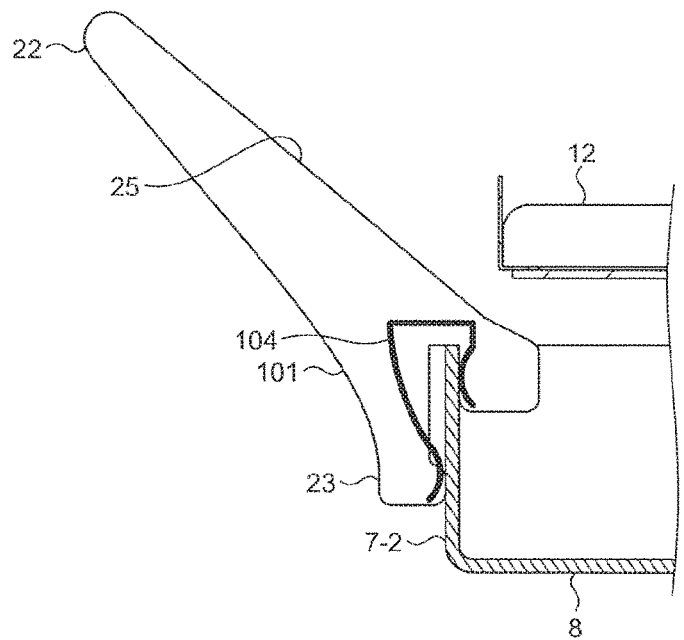
FIG. 10 is a front elevation depicting a platen auxiliary jig according to a third embodiment.

FIG. 10 is a front elevation depicting a platen auxiliary jig according to a third embodiment. More specifically, FIG. 10 depicts another platen auxiliary jig that uses such an attaching part. A platen auxiliary jig 101 includes the placing part 22 and the attaching part 23 as in the platen auxiliary jig 21 described above, as depicted in FIG. 10, and further includes a clip 104. The clip 104 is formed of an elastic body, with a part thereof being fixed to the attaching part 23. The clip 104 applies an elastic force to the left-side side part 7-2 so as to have the left-side side part 7-2 therebetween by hooking the attaching part 23 on the left-side side part 7-2 of the case 2, and fixes the placing part 22 to the base 10 via the case 2. Because the platen auxiliary jig 101 is provided with the clip 104, the platen auxiliary jig 101 can fix the placing part 22 to the left-side side part 7-2 of the case 2 more firmly, as compared with the platen auxiliary jig 21 described above. An image reading apparatus provided with the platen auxiliary jig 101 can prevent a document from falling off or moving and can hold the document appropriately by providing the placing part 22, similarly to the image reading apparatus 1 described above.

Fourth Embodiment

Still Another Platen Auxiliary Jig

Figure 11:
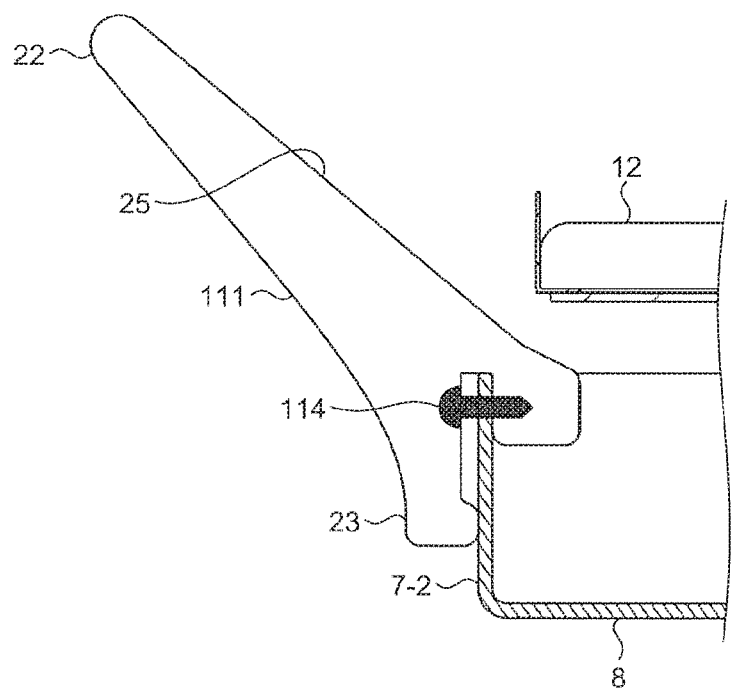
FIG. 11 is a front elevation depicting a platen auxiliary jig according to a fourth embodiment.

FIG. 11 is a front elevation depicting a platen auxiliary jig according to a fourth embodiment. As depicted in FIG. 11, a platen auxiliary jig 111 includes the placing part 22 and the attaching part 23 as in the platen auxiliary jig 21 described above, and further includes a fastening member 114. The fastening member 114 is formed of a screw. The fastening member 114 is inserted into a hole formed in the left-side side part 7-2 and fastened to a part of the attaching part 23, when the attaching part 23 is hooked on the left-side side part 7-2 of the case 2, thereby fixing the placing part 22 to the base 10 via the case 2. Because the platen auxiliary jig 111 is provided with the fastening member 114, the platen auxiliary jig 111 can fix the placing part 22 to the left-side side part 7-2 of the case 2 more firmly, as compared with the platen auxiliary jig 21 described above. An image reading apparatus provided with the platen auxiliary jig 111 can also prevent a document from falling off or moving and hold the document appropriately by providing the placing part 22, similarly to the image reading apparatus 1 described above.

Fifth Embodiment

Still Another Platen Auxiliary Jig

Figure 12:
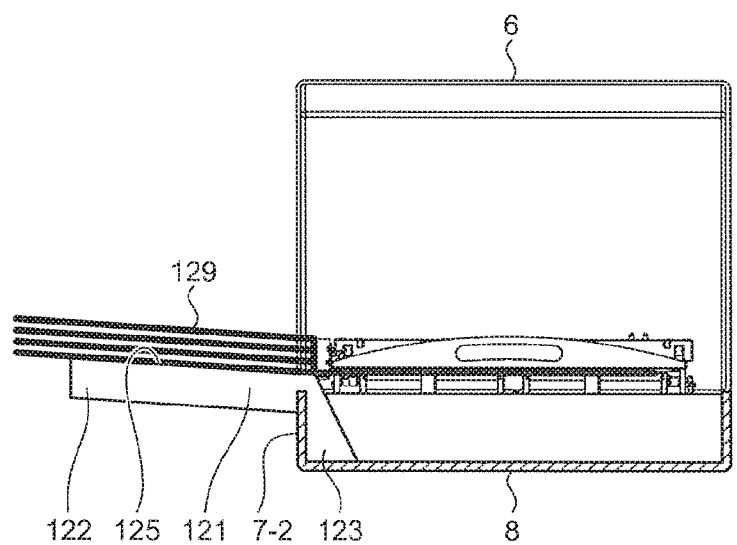
FIG. 12 is a front elevation depicting a platen auxiliary jig according to a fifth embodiment.

The platen auxiliary jig 21 can be formed so that the placing surface 25 does not incline. FIG. 12 is a front elevation depicting a platen auxiliary jig according to a fifth embodiment. As depicted in FIG. 12, a platen auxiliary jig 121 includes a placing part 122 and an attaching part 123. The placing part 122 is formed with a flat placing surface 125. The attaching part 123 is integrally bonded to the placing part 122. The attaching part 123 is hooked on the left-side side part 7-2 of the case 2, thereby fixing the placing part 122 to the base 10 via the case 2. The attaching part 123 is formed such that when the placing part 122 is fixed to the base 10, the placing surface 125 extends along a flat surface parallel to a horizontal surface on which the bottom 8 of the case 2 is placed. When a portion of a document protruding from the platen 11 does not have any risk of rolling, for example, when an album 129 is placed, the portion protruding from the platen 11 is placed on the platen auxiliary jig 121, similarly to the platen auxiliary jig 21 described above. An image reading apparatus, to which the attaching part such as the platen auxiliary jig 121 is applied, can also hold a protruding portion of a document placed on the platen 11 similarly to the image reading apparatus 1 described above, and can read the document appropriately by holding document appropriately.

Sixth Embodiment

Plurality of Platen Auxiliary Jigs

Figure 13:
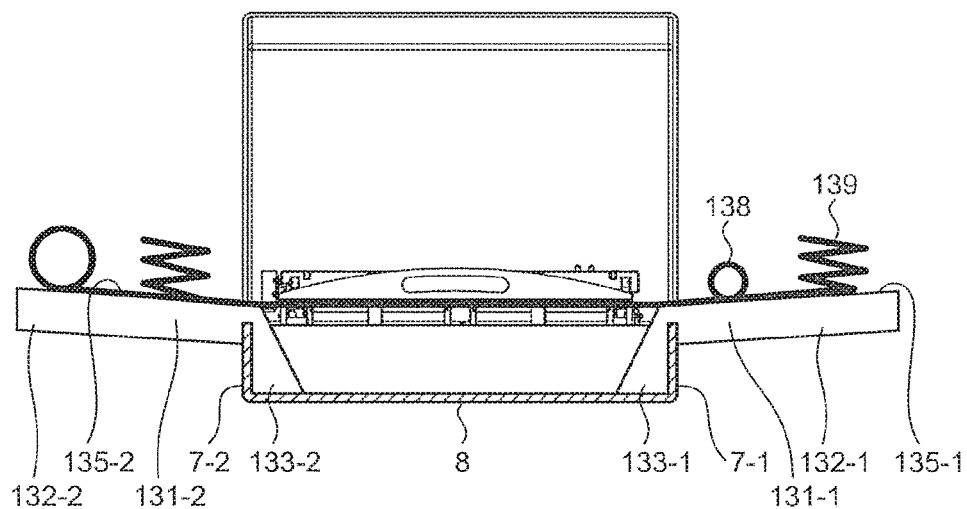
FIG. 13 is a front elevation depicting a plurality of platen auxiliary jigs according to a sixth embodiment.

The image reading apparatus 1 can include another platen auxiliary jig. FIG. 13 is a front elevation depicting a plurality of platen auxiliary jigs according to a sixth embodiment. As depicted in FIG. 13, the image reading apparatus includes a right-side platen auxiliary jig 131-1 and a left-side platen auxiliary jig 131-2. The right-side platen auxiliary jig 131-1 includes a placing part 132-1 and an attaching part 133-1. The placing part 132-1 is formed with a flat placing surface 135-1. The attaching part 133-1 is integrally bonded with the placing part 132-1. The attaching part 133-1 is hooked on the right-side side part 7-1 of the case 2 to fix the placing part 132-1 to the base 10 via the case 2. The attaching part 133-1 is formed such that when the placing part 132-1 is fixed to the base 10, the placing surface 135-1 extends along a flat surface parallel to the horizontal surface on which the bottom 8 of the case 2 is placed. The left-side platen auxiliary jig 131-2 is formed similarly to the right-side platen auxiliary jig 131-1, that is, includes a placing part 132-2 and an attaching part 133-2. The placing part 132-2 is formed with a flat placing surface 135-2. The attaching part 133-2 is integrally bonded with the placing part 132-2. The attaching part 133-2 is hooked on the left-side side part 7-2 of the case 2 to fix the placing part 132-2 to the base 10 via the case 2. The attaching part 133-2 is formed such that when the placing part 132-2 is fixed to the base 10, the placing surface 135-2 extends along a flat surface parallel to the horizontal surface on which the bottom 8 of the case 2 is placed.

At this time, the case 2 is formed to be able to house both the right-side platen auxiliary jig 131-1 and the left-side platen auxiliary jig 131-2 together with the image reading apparatus body 3. An image reading apparatus including these platen auxiliary jigs can hold a document appropriately similarly to the image reading apparatus 1 described above and can be formed compact. In the image reading apparatus including these platen auxiliary jigs, when an accordion book 139 and a lengthy book exemplified by a handscroll 138 are to be computerized, these books can be placed on the platen 11, the right-side platen auxiliary jig 131-1, and the left-side platen auxiliary jig 131-2. Such an image reading apparatus can hold such a lengthy book appropriately by placing opposite ends of the lengthy book on the right-side platen auxiliary jig 131-1 and the left-side platen auxiliary jig 131-2, respectively.

Seventh Embodiment

Still Another Platen Auxiliary Jig

Figure 14:
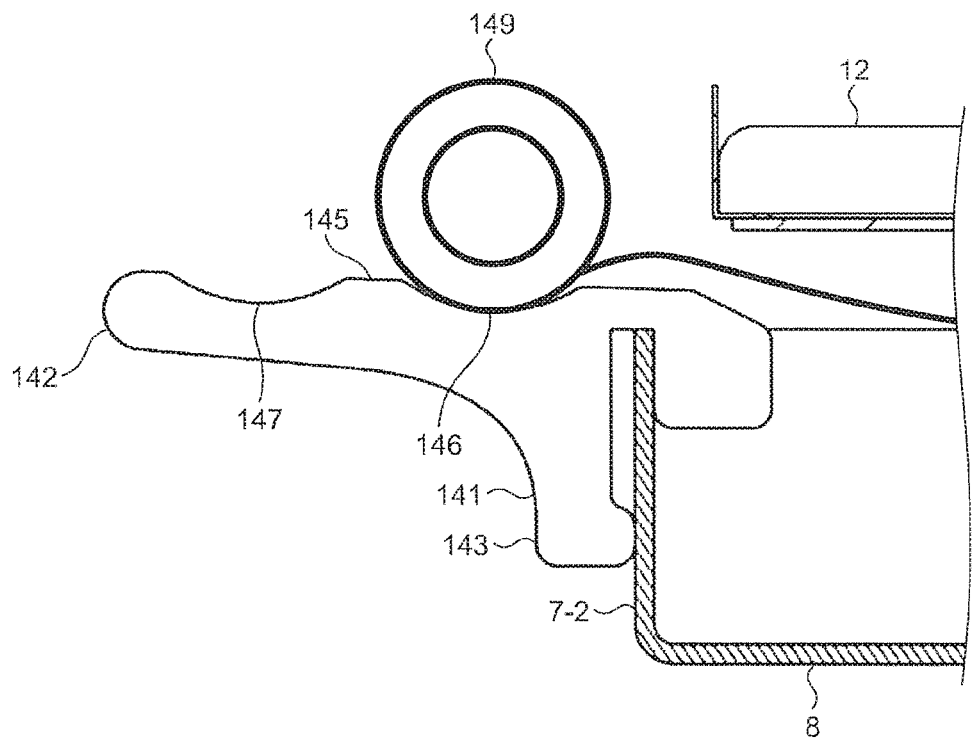
FIG. 14 is a front elevation depicting a platen auxiliary jig according to a seventh embodiment.

A placing surface that is not flat can be formed in the platen auxiliary jig. FIG. 14 is a front elevation depicting a platen auxiliary jig according to a seventh embodiment. A platen auxiliary jig 141 includes, as depicted in FIG. 14, a placing part 142 and an attaching part 143. The attaching part 143 is hooked on the left-side side part 7-2 of the case 2 and fixed to the base 10 via the case 2. The placing part 142 is integrally bonded with the attaching part 143. The placing part 142 is formed with a placing surface 145 facing upward when the attaching part 143 is fixed to the base 10. The placing surface 145 includes a dent 146 and a dent 147 formed therein. In the platen auxiliary jig 141, when a handscroll book 149 is placed on the platen 11, the handscroll book 149 can be placed on the placing surface 145 so that one edge of the handscroll hook 149 is fitted into the dent 146 or the dent 147. By fitting one edge of the handscroll book 149 into the dent 146 or the dent 147, the platen auxiliary jig 141 can prevent the one edge of the handscroll book 149 from rolling and falling off from the platen auxiliary jig 141.

Eighth Embodiment

Still Another Platen Auxiliary Jig

Figure 15:
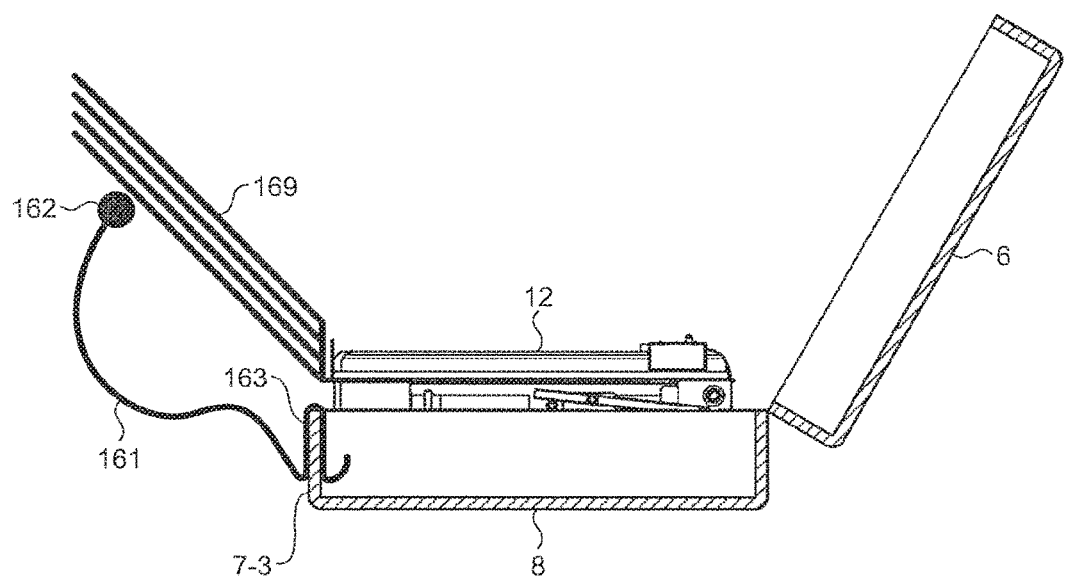
FIG. 15 is a front elevation depicting a platen auxiliary jig according to an eighth embodiment.

FIG. 15 is a front elevation depicting a platen auxiliary jig according to an eighth embodiment. A platen auxiliary jig 161 is formed of a material exemplified by a metal material, and the shape thereof can be deformed, and the deformed shape can be maintained. As depicted in FIG. 15, the platen auxiliary jig 161 as formed in a string shape. The platen auxiliary jig 161 includes a placing part 162 and an attaching part 163. The attaching part 163 is formed on one end side of the platen auxiliary jig 161 and is hooked on the front-side side part 7-3 of the case 2 by being appropriately plastic-deformed by a user, to fix the entire platen auxiliary jig 161 to the base 10 via the case 2. The placing part 162 is formed in a spherical shape and is formed on the other end opposite to the one end at which the attaching part 163 is formed. A portion of a document protruding from the platen 11 comes into point contact with the placing part 162 and is placed thereon. By appropriately plastic-deforming the platen auxiliary jig 161 by a user, the placing part 162 is formed to be arranged at a predetermined position. In an image reading apparatus including the platen auxiliary jig 161, although a flat placing surface is not formed in the placing part 162, a document exemplified by an album 169 can be placed on the placing part 162. Therefore, an image reading apparatus including the platen auxiliary jig 161 can hold a document appropriately by placing a portion of a document protruding from the platen 11 on the placing part 162, similarly to the platen auxiliary jig described above. The platen auxiliary jig 161 can be hooked on the right-side side part 7-1 or the left-side side part 7-2 of the case 2 and fixed.

Ninth Embodiment

Still Another Platen Auxiliary Jig

Figure 16:
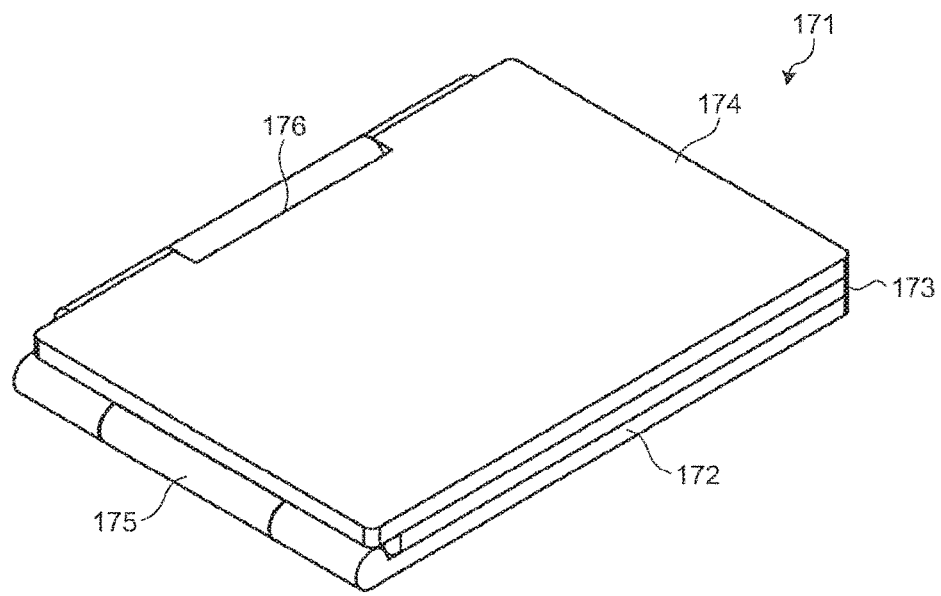
FIG. 16 is a perspective view depicting a platen auxiliary jig according to a ninth embodiment.

The platen auxiliary jig 21 can be replaced by another platen auxiliary jig that can move without being detached from the image reading apparatus body 3. FIG. 16 is a perspective view depicting a platen auxiliary jig according to a ninth embodiment. A platen auxiliary jig 171 includes a first placing part 173, a second placing part 174, a first hinge part 175, and a second hinge part 176. The first placing part 173 is formed in a plate shape having substantially the same size as a platen body 172 of the left-side platen 11-2. The second placing part 174 is formed in a plate shape having substantially the same size as the platen body 172. The first hinge part 175 supports the first placing part 173 rotatably around a rotary axis that extends along one side of the platen body 172 on the side of the front-side side part 7-3. The first hinge part 175 also includes a first fixing part (not depicted). The first fixing part restricts rotation of the first placing part 173 so as not to rotate in a direction being opened from the platen body 172 but to rotate only in a direction being closed to the platen body 172. The first fixing part releases the first placing part 173 rotatably in the direction being opened from the platen body 172 when the first placing part 173 is closed at a predetermined angle (for example, 60 degrees) or less. The second hinge part 176 supports the second placing part 174 rotatably around a rotary axis that extends along one side of the first placing part 173 on the side of the left-side side part 7-2, when the first placing part 173 is arranged to overlap on the platen body 172. The first hinge part 175 also includes a second fixing part (not depicted). The second fixing part restricts rotation of the second placing part 174 so as not to rotate in a direction being opened from the first placing part 173 but to rotate only in a direction being closed to the first placing part 173. The second fixing part releases the second placing part 174 rotatably in the direction being opened from the first placing part 173 when the second placing part 174 is closed to a predetermined angle (for example, 60 degrees) or less. The first hinge part 175 and the second hinge part 176 are known and are used for adjusting the angle of a back of a legless chair.

The platen auxiliary jig 171 can be housed in the case 2 together with the image reading apparatus body 3, as depicted in FIG. 16, in a state in which the first placing part 173 and the second placing part 174 are arranged to overlap on the platen body 172.

Figure 17:
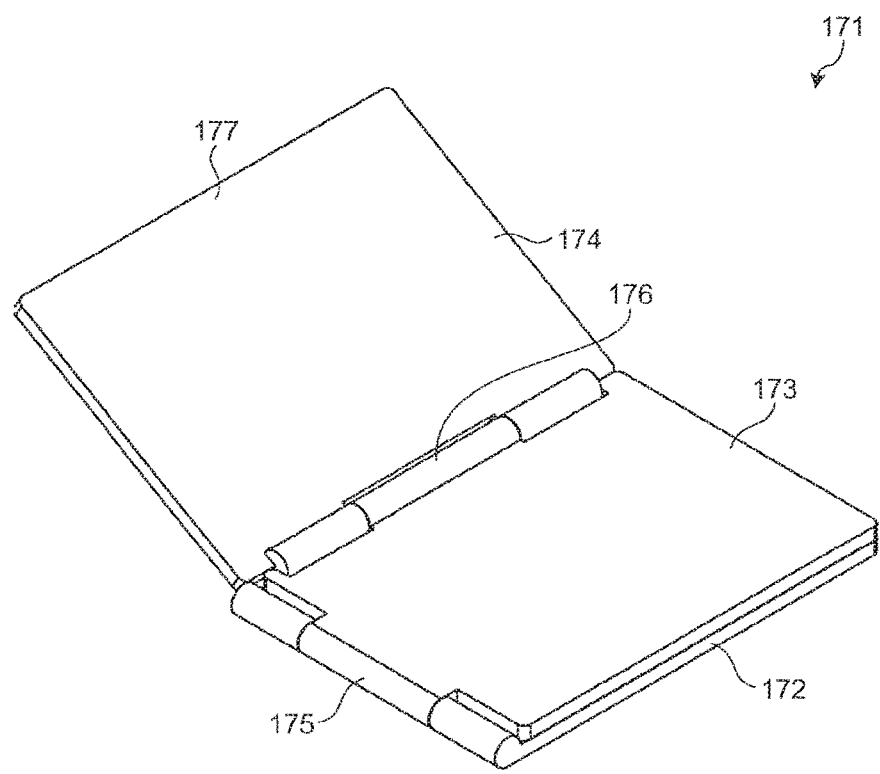
FIG. 17 is a perspective view depicting another state of the platen auxiliary jig depicted in FIG. 16.

FIG. 17 is a perspective view depicting another state of the platen auxiliary jig depicted in FIG. 16. More specifically, FIG. 17 depicts the platen auxiliary jig 171 fixed in a state in which the first placing part 173 overlaps on the platen body 172, and the second placing part 174 is opened from the first placing part 173. The second placing, part 174 interferes with toe lid 6 if the case body 5 is to be closed by the lid 6 of the case 2 in this state. In the second placing part 174, a placing surface 177 is formed on a surface facing the first placing part 173 when the second placing part 174 overlaps on the first placing part 173. In the platen auxiliary jig 171, when a document placed on the platen 11 protrudes to the side of the left-side side part 7-2 in this state, the protruding portion is placed on the placing surface 177 of the second placing part 174.

Figure 18:
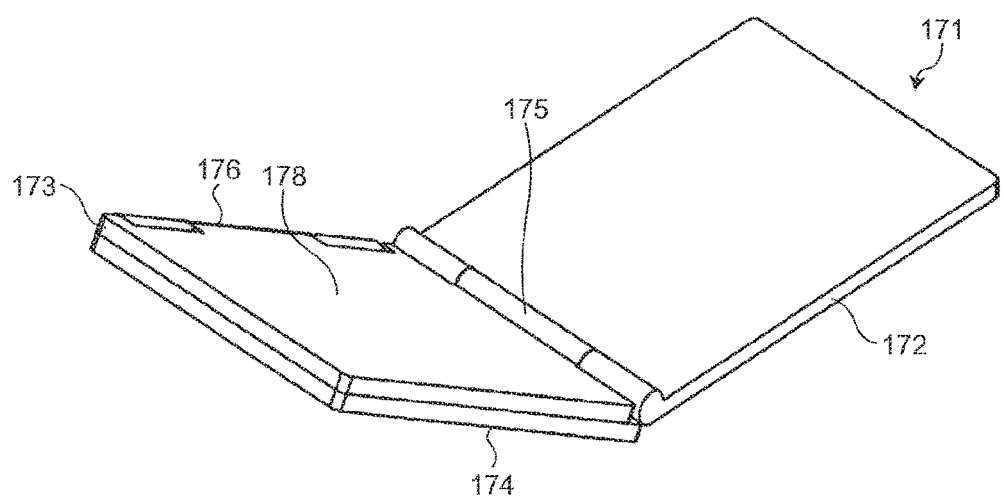
FIG. 18 is a perspective view depicting still another state of the platen auxiliary jig depicted in FIG. 16.

FIG. 18 is a perspective view depicting still another state of the platen auxiliary jig depicted in FIG. 16. More specifically, FIG. 18 depicts the platen auxiliary jig 171 fixed in a state in which the second placing part 174 overlaps on the first placing part 173 and the first placing part 173 is opened from the platen body 172. If the case body 5 is to be closed by the lid 6 of the case 2 in this state, the first placing part 173 interferes with the lid 6. In the first placing part 173, a placing surface 178 is formed on a surface facing the platen body 172 when the first placing part 173 overlaps on the platen body 172. In the platen auxiliary jig 171, when a document placed on the platen 11 protrudes to the side of the front-side side part 7-3 in this state, the protruding portion is placed on the placing surface 178 of the first placing part 173.

In this manner, a portion of a document protruding from the platen 11 can be placed on the platen auxiliary jig 171 similarly to the platen auxiliary jig 21 described above. Time and labor for attachment of the platen auxiliary jig 171 to the case 2 can be saved and a placing surface on which a protruding portion is placed can be arranged more easily, as compared with the platen auxiliary jig 21 described above. An image reading apparatus provided with the platen auxiliary jig 171 can be made compact and can be carried easily, by folding the first placing part 173 and the second placing part 174.

The image reading apparatus provided with the platen auxiliary jig 171 can be carried easily without separating the platen auxiliary jig 171 from the image reading apparatus body 3, even if the case 2 that houses the image reading apparatus body 3 is omitted. In the image reading apparatus from which the case 2 is omitted, the base 10 of the image reading apparatus body 3 is placed on the workbench. The image reading apparatus from which the case 2 is omitted can also hold a document appropriately by the first placing part 173 and the second placing part 174.

Tenth Embodiment

Another Interlocking Mechanism

Figure 19:
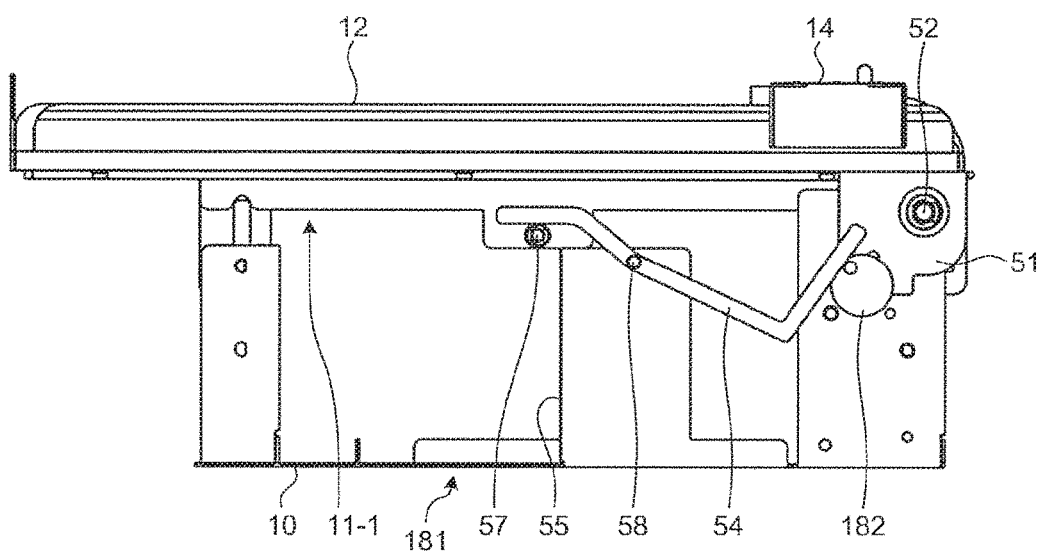
FIG. 19 is a side view depicting an interlocking mechanism according to a tenth embodiment.

The interlocking mechanism 53 can be formed in such a manner that a relation between an angle of the copyholder 12 and a height of the platen body 30 is not linear. FIG. 19 is a side view depicting an interlocking mechanism according to a tenth embodiment. An interlocking mechanism 181 includes the link 54, the fulcrum base 55, and the point of load 57 similarly to the interlocking mechanism 53 described above, and a cam 182. The cam 182 is formed in a projection projecting from a part of the support member 51 of the copyholder 12 toward the right-side side part 7-1, so that a distance from the rotary axis 52 of the copyholder 12 to the periphery of the cam 182 is not constant.

Figure 20:
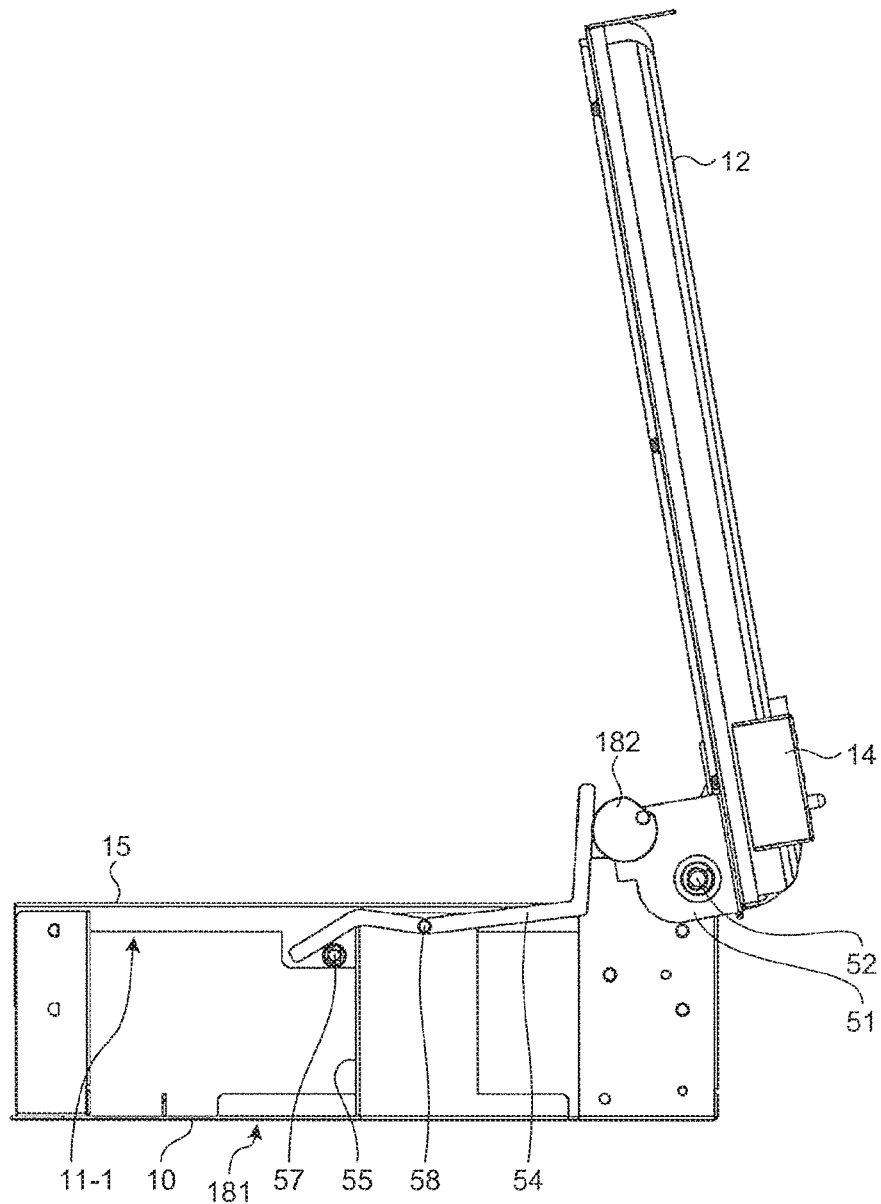
FIG. 20 is a side view depicting another state of the interlocking mechanism depicted in FIG. 19.

FIG. 20 is a side view depicting another state of the interlocking mechanism 181 depicted in FIG. 19. More specifically, FIG. 20 depicts a state after the copyholder 12 is rotated around the rotary axis 32 so that the transparent flat plate 16 moves away from the placing surface 15 of the right-side platen 11-1. At this time, the interlocking mechanism 181 is formed such that a distance from the rotary axis 52 of the copyholder 12 to a point at which the link 54 and the cam 182 come into contact with each other changes more largely, as compared with the interlocking mechanism 53.

Figure 21:
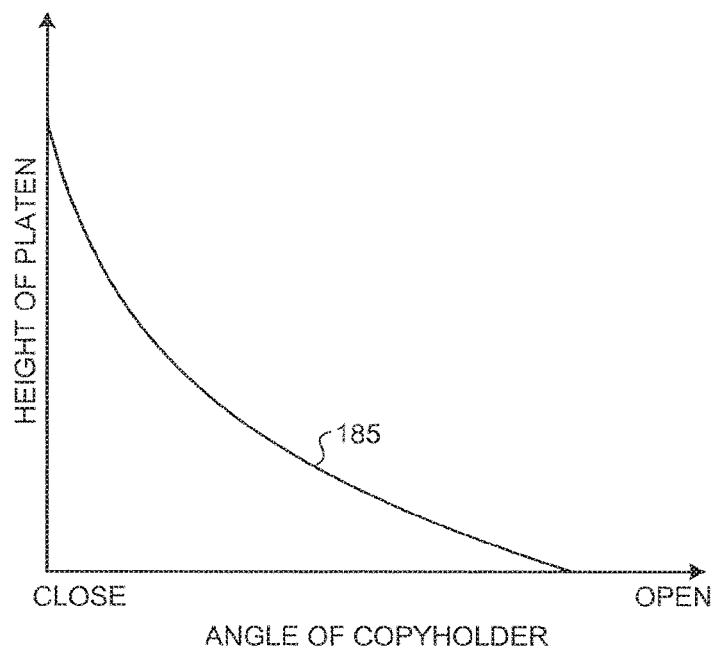
FIG. 21 is a graph depicting a relation between an angle of a copyholder and a height of a platen body in the tenth embodiment.

FIG. 21 is a graph depicting a relation between an angle of the copyholder and a height of the platen body in the tenth embodiment. A curve 185 on the graph indicates that as the angle of the copyholder 12 increases, the height of the platen body 30 monotonously decreases. The curve 185 on the graph also indicates that as the angle of the copyholder 12 decreases, that is, as the copyholder 12 becomes closer to the platen body 30, a moving distance of the platen body 30 moving up and down when the copyholder 12 rotates by a unit angle increases. That is, the moving distance per unit angle of the platen body 30 when the transparent flat plate 16 is arranged near the platen 11 increases than the moving distance per unit angle of the platen body 30 when the transparent flat plate 16 is arranged at a position far from the platen 11.

In an image reading apparatus provided with the interlocking mechanism 181, because the copyholder 12 and the platen body 30 interlock with each other in this manner, the transparent flat plate 16 can approach the platen 11 from the position away from the platen 11 with an angle close to parallel to the placing surface of the platen 11. Therefore, in the image reading apparatus, even when the thickness of a document placed on the platen 11 is thick, the transparent flat plate 16 of the copyholder 12 can come into contact with a reading surface of the document with an angle close to parallel. The image reading apparatus can prevent a document placed on the platen 11 from crinkling when the transparent flat plate 16 of the copyholder 12 is pressed against the document and can read the reading surface of the document appropriately. The image reading apparatus provided with the interlocking mechanism 181 can also prevent a document from falling off or moving and can hold the document appropriately, because the placing part is provided similarly to the image reading apparatus 1 described above.

Eleventh Embodiment

Still Another Interlocking Mechanism

Figure 22:
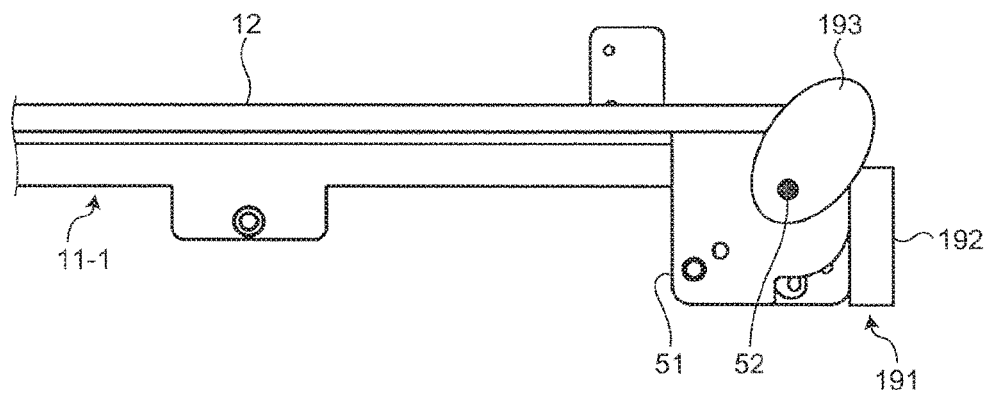
FIG. 22 is a side view depicting an interlocking mechanism according to an eleventh embodiment.

The interlocking mechanism 53 can be also formed of another mechanism different from the link mechanism. FIG. 22 is a side view depicting an interlocking mechanism according to an eleventh embodiment. An interlocking mechanism 191 includes, as depicted in FIG. 22, a plate 192 and a cam 193. The plate 192 is arranged on the side of the base 10 of the platen body 30 and is fixed to the platen body 30. The cam 193 is formed in a columnar shape, arranged so that an axis of a columnar body becomes parallel to the rotary axis 52 of the copyholder 12 and the cam 193 intersects with the rotary axis 52 of the copyholder 12, and is fixed to the support member 51 of the copyholder 12. The cam 193 is formed in such a manner that when rotating around the rotary axis 52 together with the copyholder 12, a side surface of the columnar body slides to an end of the plate 192 on the side far from the base 10.

In the interlocking mechanism 191, the cam 193 pushes down an end of the plate 192 on the side far from the base 10 when rotating around the rotary axis 52 to open the copyholder 12, thereby moving the platen body 30 of the right-side platen 11-1 downward similarly to the interlocking mechanism 53. An image reading apparatus provided with the interlocking mechanism 191 can move the platen body 30 of the right-side platen 11-1 upward when the copyholder 12 is closed, similarly to the image reading apparatus 1 described above. Therefore, the image reading apparatus can prevent a document placed on the platen 11 from crinkling. Similarly to the image reading apparatus 1 described above, the image reading apparatus provided with the interlocking mechanism 191 can prevent a document from falling off or moving and can hold the document appropriately, because the placing part is provided.

Twelfth Embodiment

Still Another Interlocking Mechanism

Figure 23:
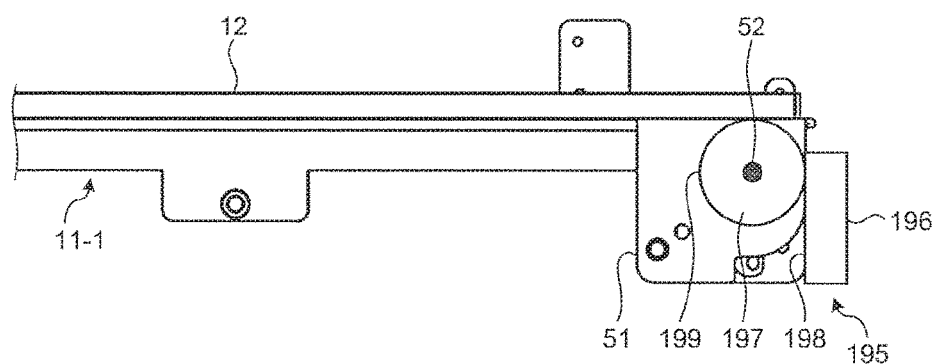
FIG. 23 is a side view depicting an interlocking mechanism according to a twelfth embodiment.

FIG. 23 is a side view depicting an interlocking mechanism according to a twelfth embodiment. An interlocking mechanism 195 includes, as depicted in FIG. 23, a rack 196 and a pinion 197. The rack 196 is formed in a plate shape and includes a plurality of teeth 198 formed thereon. The rack 196 is arranged on the side of the base 10 of the platen body 30 and is fixed to the platen body 30 so that the teeth 198 faces the side of the rotary axis 52 of the copyholder 12. The pinion 197 is formed in a disk shape and a plurality of teeth 199 are arranged around the disk. The pinion 197 is fixed to the support member 51 of the copyholder 12 so that a central axis of the disk overlaps on the rotary axis 52 of the copyholder 12 and the teeth 199 engage with the teeth 198 of the pinion 197.

Because the interlocking mechanism 195 is formed in this manner, when the interlocking mechanism 195 rotates around the rotary axis 52 to open the copyholder 12, the pinion 197 pushes the rack 196 downward. Because the pinion 197 pushes the rack 196 downward, the interlocking mechanism 195 can move the platen body 30 of the right-side platen 11-1 downward similarly to the interlocking mechanism 53. The cam 193 releases the plate 192 when rotating around the rotary axis 52 to close the copyholder 12. Therefore, the interlocking mechanism 195 can move the platen body 30 of the right-side platen 11-1 upward similarly to the interlocking mechanism 53.

An image reading apparatus to which the interlocking mechanism 195 is applied can cause the transparent flat plate 16 to approach the platen 11 with an angle close to parallel to the placing surface of the platen 11 similarly to the image reading apparatus 1 described above. Therefore, the image reading apparatus can prevent a document placed on the platen 11 from crinkling when the transparent flat plate 16 of the copyholder 12 is pressed against the document and can read the reading surface of the document appropriately. Similarly to the image reading apparatus 1 described above, the image reading apparatus provided with the interlocking mechanism 195 can prevent a document from falling off or moving and can hold the document appropriately, because the placing part is provided.

In the image reading apparatus, the interlocking mechanism can be omitted. Similarly to the image reading apparatus 1 described above, an image reading apparatus from which the interlocking mechanism is omitted can prevent a document from falling off or moving and can hold the document appropriately, because the placing part described above is provided.

In the image reading apparatus, the platen can be formed so that the placing surface of the platen does not move up and down and is fixed to the base 10. Similarly to the image reading apparatus 1 described above, an image reading apparatus that includes a platen formed with a placing surface fixed to the base 10 can prevent a document from falling off or moving and can hold the document appropriately, because the placing part described above is provided.

According to the disclosed modes, a document can be held appropriately.

Although the invention has been described with respect to specific embodiments for a complete and clear disclosure, the appended claims are not to be thus limited hut are to be construed as embodying all modifications and alternative constructions that may occur to one skilled in the art that fairly fall within the basic teaching herein set forth.

What is claimed is:

1. An image reading apparatus comprising:
   a platen;
   a copyholder pressed against a reading surface of a document placed on the platen;
   a placing part movably provided, on which a non-pressed portion of the document that is not pressed by the copyholder is placed;
   a base that supports the copyholder rotatably around a rotary axis; and
   an interlocking mechanism configured to convert rotary motion of the copyholder to up and down motion of the platen with respect to the base, the platen moving up and down in a direction not parallel to an axial direction of the rotary axis.

2. The image reading apparatus according to claim 1, wherein the placing part is formed so that a first region of a placing surface thereof on which the non-pressed portion is placed on a side away from the platen becomes higher than a second region of the placing surface near the platen than the first region.

3. The image reading apparatus according to claim 1, wherein the placing part is formed with a dent in a region on which the non-pressed portion is placed.

4. The image reading apparatus according to claim 1, further comprising:
   an attaching part that attaches the placing part to a base that supports the platen and the copyholder, so that the non-pressed portion is placed on the placing part.

5. The image reading apparatus according to claim 4, further comprising:
   a case that houses the placing part together with the platen and the copyholder when the placing part is detached from the base.

6. The image reading apparatus according to claim 1, further comprising:
   a hinge part that rotatably supports the placing part on the platen; and
   a fixing part that stops rotation of the placing part with respect to the platen.

7. The image reading apparatus according to claim 1, wherein the placing part includes
   a first placing part, and a second placing part,
   the image reading apparatus further comprising:
   a first hinge part that rotatably supports the first placing part on the platen;
   a first fixing part that stops rotation of the first placing part with respect to the platen;
   a second hinge part that rotatably supports the second placing part on the first placing part; and
   a second fixing part that stops rotation of the second placing part with respect to the first placing part.

8. The image reading apparatus according to claim 1, wherein the interlocking mechanism is formed not to come into contact with the non-pressed portion.

9. The image reading apparatus according to claim 1 wherein the interlocking mechanism includes
   a link supported on the base rotatably around a fulcrum point,
   a point of effort that rotates the link by rotation of the copyholder, and
   a point of load that moves the platen up and down by rotation of the link, and
   the fulcrum point is arranged below a placing surface of the platen where the document is placed.

10. The image reading apparatus according to claim 1, wherein the interlocking mechanism is formed in such a manner that as the copyholder becomes closer to the platen, a moving distance of the platen moving up and down when the copyholder rotates by a unit angle increases.

11. The image reading apparatus according to claim 1, wherein through
   the interlocking mechanism moves the platen down when the copyholder rotates in a direction away from the platen, and
   the interlocking mechanism moves the platen up when the copyholder rotates in a direction approaching the platen.

* * * * *